US009722277B2

(12) United States Patent
Xiao et al.

(10) Patent No.: US 9,722,277 B2
(45) Date of Patent: Aug. 1, 2017

(54) ELECTROLYTE FOR BATTERIES WITH REGENERATIVE SOLID ELECTROLYTE INTERFACE

(71) Applicant: Battelle Memorial Institute, Richland, WA (US)

(72) Inventors: Jie Xiao, Richland, WA (US); Dongping Lu, Richland, WA (US); Yuyan Shao, Richland, WA (US); Wendy D. Bennett, Richland, WA (US); Gordon L. Graff, Richland, WA (US); Jun Liu, Richland, WA (US); Ji-Guang Zhang, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 126 days.

(21) Appl. No.: 14/530,562

(22) Filed: Oct. 31, 2014

(65) Prior Publication Data
US 2016/0126589 A1    May 5, 2016

(51) Int. Cl.
| | |
|---|---|
| *H01M 10/056* | (2010.01) |
| *H01M 10/0525* | (2010.01) |
| *H01M 10/0568* | (2010.01) |
| *H01M 10/0569* | (2010.01) |
| *H01M 4/38* | (2006.01) |
| *H01M 10/054* | (2010.01) |
| *H01M 4/587* | (2010.01) |

(52) U.S. Cl.
CPC ........... *H01M 10/056* (2013.01); *H01M 4/38* (2013.01); *H01M 4/587* (2013.01); *H01M 10/054* (2013.01); *H01M 10/0525* (2013.01); *H01M 10/0568* (2013.01); *H01M 10/0569* (2013.01); *H01M 2300/004* (2013.01); *H01M 2300/0028* (2013.01)

(58) Field of Classification Search
None
See application file for complete search history.

(56) References Cited

U.S. PATENT DOCUMENTS

| 4,071,665 A | 1/1978 | Garth |
|---|---|---|
| 6,218,054 B1 | 4/2001 | Webber |
| 2010/0021815 A1 | 1/2010 | Oh et al. |
| 2012/0135278 A1 | 5/2012 | Yoshie et al. |
| 2013/0224538 A1 | 8/2013 | Jansen et al. |
| 2013/0266875 A1 | 10/2013 | Matsumoto et al. |
| 2014/0302370 A1 | 10/2014 | Woodford |

(Continued)

OTHER PUBLICATIONS

International Search Report and Written Opinion issued in application No. PCT/US2015/058131 on Jan. 20, 2016, 7 pages.

(Continued)

*Primary Examiner* — Patrick Ryan
*Assistant Examiner* — Wyatt McConnell
(74) *Attorney, Agent, or Firm* — Klarquist Sparkman, LLP

(57) ABSTRACT

An energy storage device comprising:
an anode; and
a solute-containing electrolyte composition wherein the solute concentration in the electrolyte composition is sufficiently high to form a regenerative solid electrolyte interface layer on a surface of the anode only during charging of the energy storage device, wherein the regenerative layer comprises at least one solute or solvated solute from the electrolyte composition.

9 Claims, 23 Drawing Sheets

(56) References Cited

U.S. PATENT DOCUMENTS

| | | | |
|---|---|---|---|
| 2015/0024121 A1* | 1/2015 | He | H01M 10/0566 427/121 |
| 2015/0060290 A1 | 3/2015 | Xu | |
| 2015/0111097 A1 | 4/2015 | Park et al. | |

OTHER PUBLICATIONS

Brummer et al., "Technical Report: Low temperature lithium/sulfur secondary battery. Annual progress report, Dec. 1, 1974-Dec. 1, 1975," *Energy Research and Development Administration, Division of Electrical Energy Systems*, 69 pages, Apr. 1976.

International Search Report and Written Opinion issued in international application PCT/US2015/038627 on Oct. 21, 2015, 7 pages.

Matsumoto et al., "Performance Improvement of Li Ion Battery with Non-Flammable TMP Mixed Electrolyte by Optimization of Lithium Salt Concentration and SEI Performation Technique on Graphite Anode," *J. Electrochem. Soc.*, 161(5): A831-A834, Apr. 2014.

Matsumoto et al., "SEI Pre-coated Graphite Anode in Lithium Ion Battery with EMITFSI Ionic Liquid Eletrolye," *The Electrochemical Society*, 215th ECS Meeting, Abstract #179, downloaded May 4, 2015.

Nie et al., "Lithium Ion Battery Graphite Solid Electrolyte Interphase Revealed by Microscopy and Spectroscopy," *J. Phys. Chem. C*, 117(3): 1257-1267, Jan. 2013.

Schneider et al., "One the Electrode Potentials in Lithium-Sulfur Batteries and Their Solvent-Dependence," *Journal of the Electrochemical Society*, 161(9): A1399-A1406, Jun. 20, 2014.

Sodeyama et al., "Sacrificial Anion Reduction Mechanism for Electrochemical Stability Improvement in Highly Concentrated Li-Salt Electrolyte," *Journal of Physical Chemistry*, 118(26): 14091-14097, Jun. 25, 2014.

U.S. Appl. No. 14/529,840, filed Oct. 31, 2014.

U.S. Appl. No. 14/530,442, filed Oct. 31, 2014.

Verma et al., "A review of the features and analyses of the solid electrolyte interphase in Li-ion batteries," *Electrochemica Acta*, 55(22):6332-6341, Sep. 2010.

Xu et al., "Lithium Bis(oxalato)borate Stabilizes Graphite Anode in Proplylene Carbonate," *Electrochemical and Solid-State Letters*, 5(11): A259-A262, Sep. 2002.

Yamada et al., "A superconcentrated ether electrolyte for fast-charging Li-ion batteries," *Chem. Commun.*, No. 49, pp. 11194-11196, Oct. 2013.

Yamada et al., "General Observation of Lithium Intercalation into Graphite in Ethylene-Carbonate-Free Superconcentrated Electrolytes," 6(14): 10892-10899, Mar. 26, 2014.

Yamada et al., "Unusual Stability of Acetonitrile-Based Superconcentrated Electrolytes for Fast-Changing Lithium-Ion Batteries," *J. Am. Chem. Soc.*, 136(13):5039-5046, Mar. 2014.

Zhang et al., "Liquid Electrolyte lithium/sulfur battery: Fundamental chemistry, problems, and solutions," *Journal of Power Sources*, No. 231, pp. 153-162, Dec. 27, 2012.

\* cited by examiner

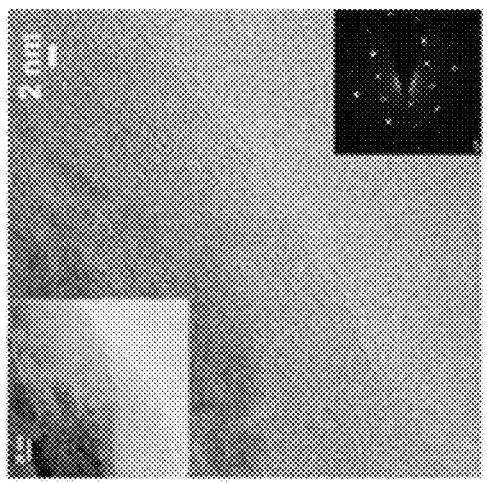
FIG. 5a
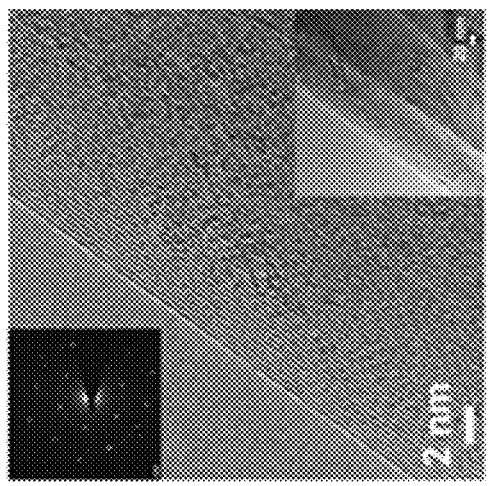
FIG. 5b
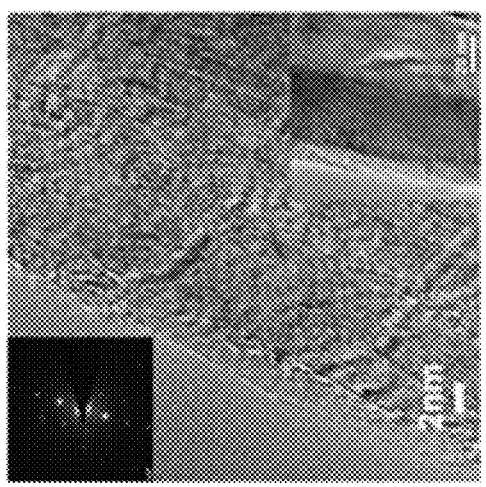
FIG. 5c
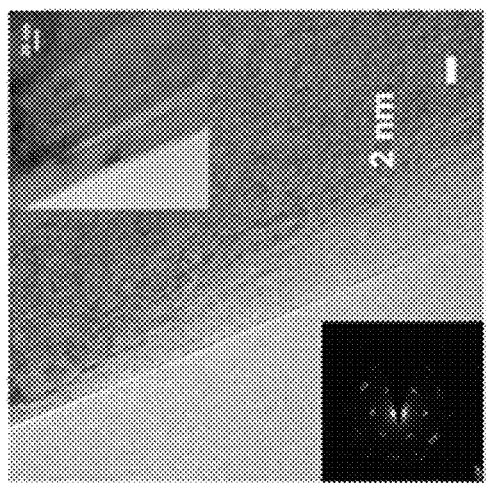
FIG. 5d
FIG. 5

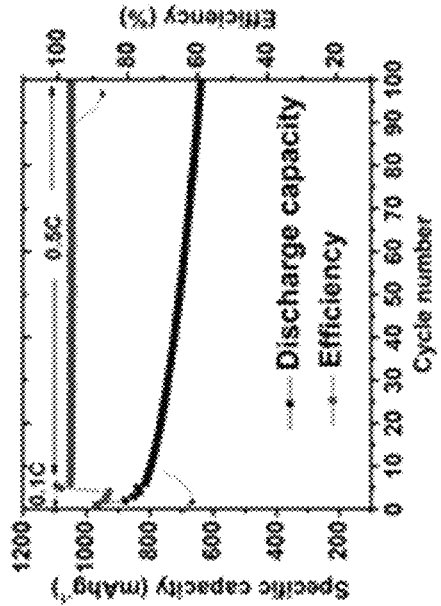
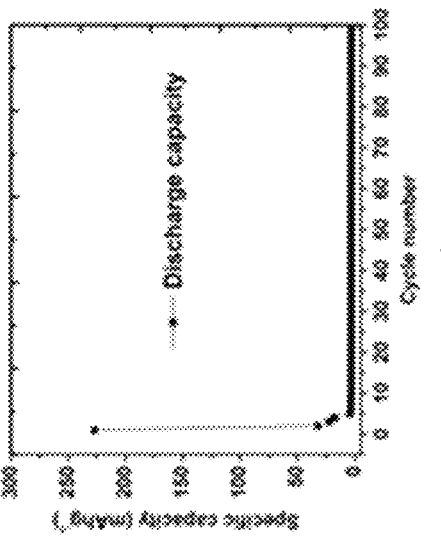
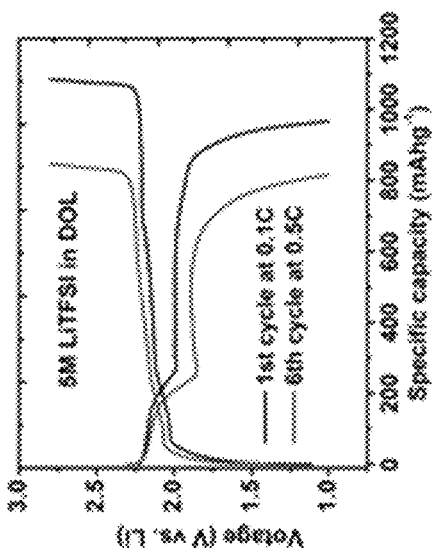
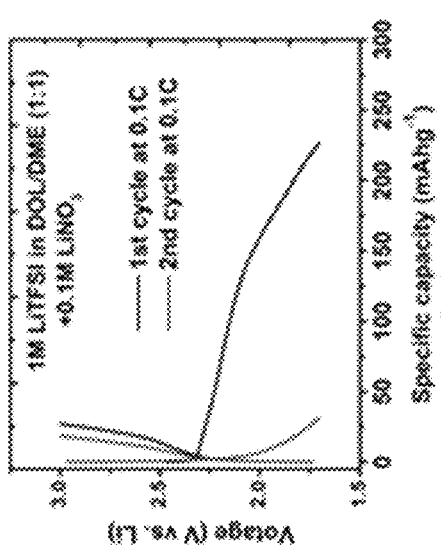
FIG. 6

FIG. 7
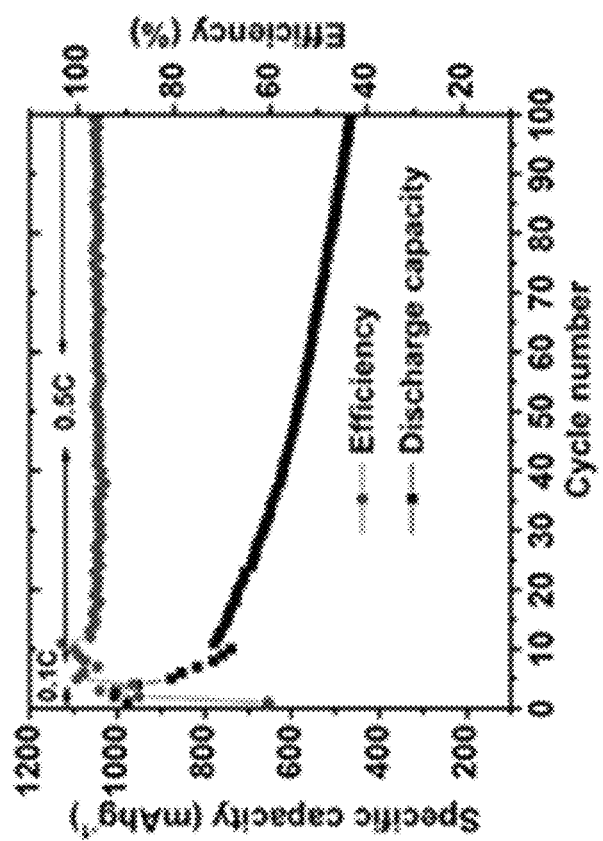
FIG. 7b
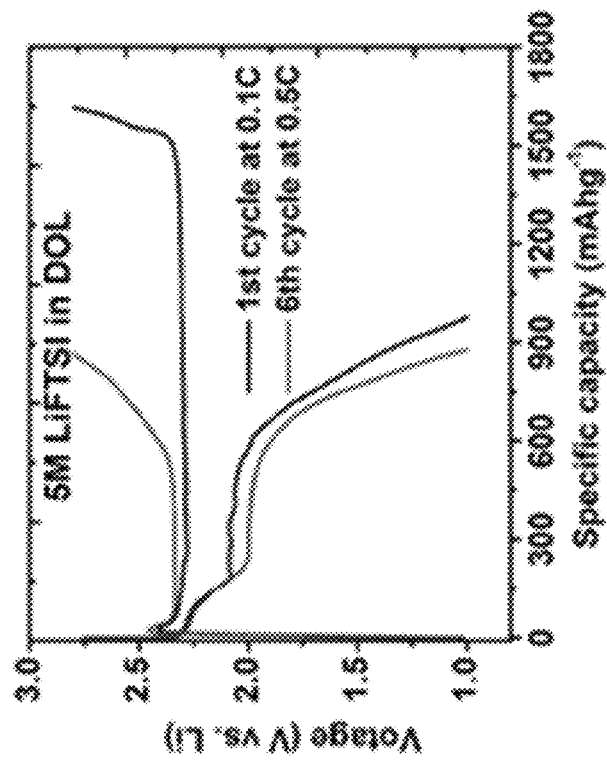
FIG. 7a

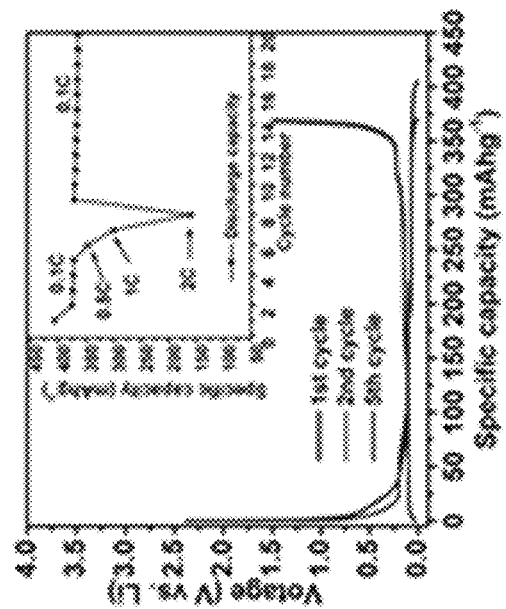
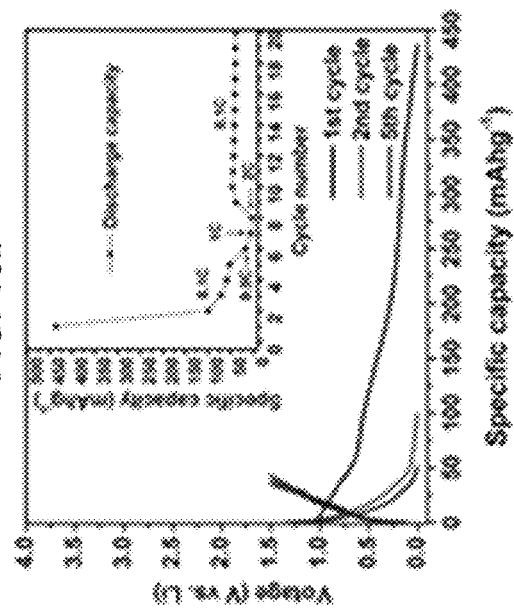
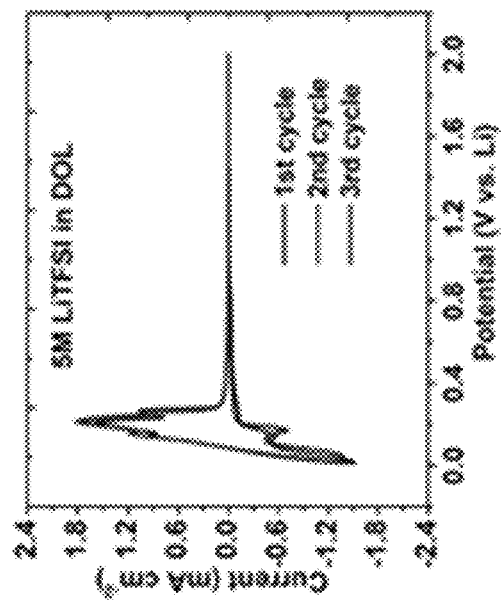
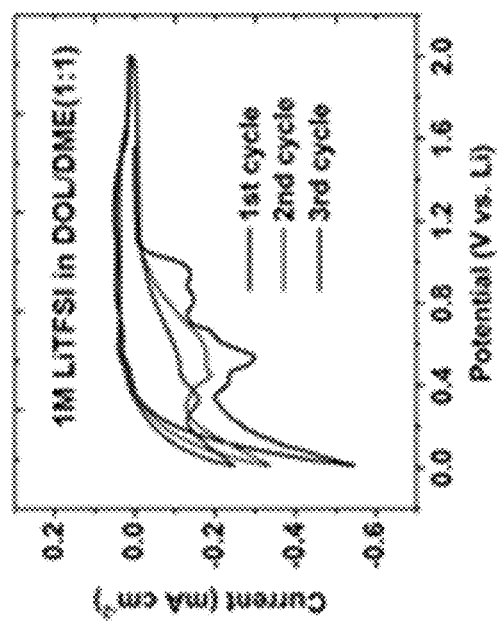
FIG. 10
FIG. 10a
FIG. 10b
FIG. 10c
FIG. 10d

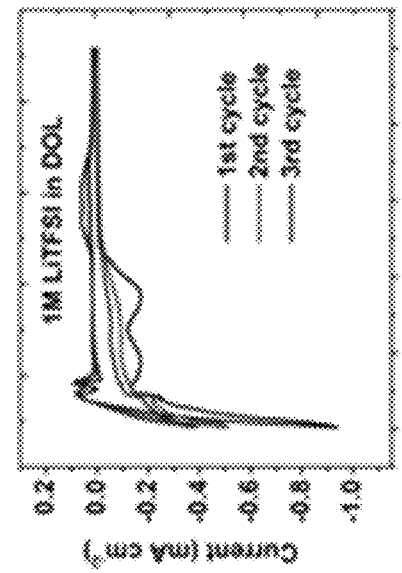
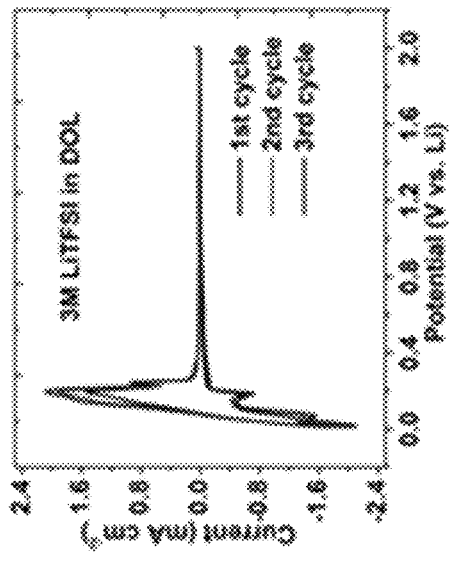
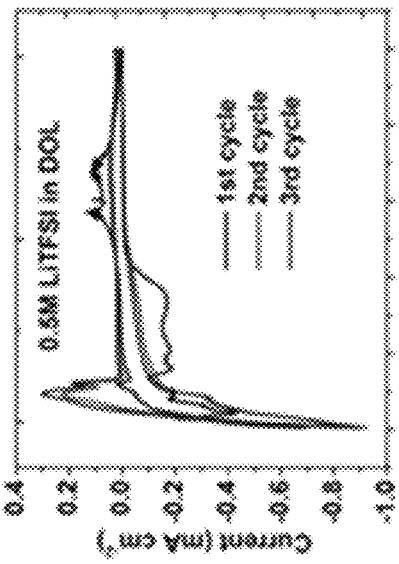
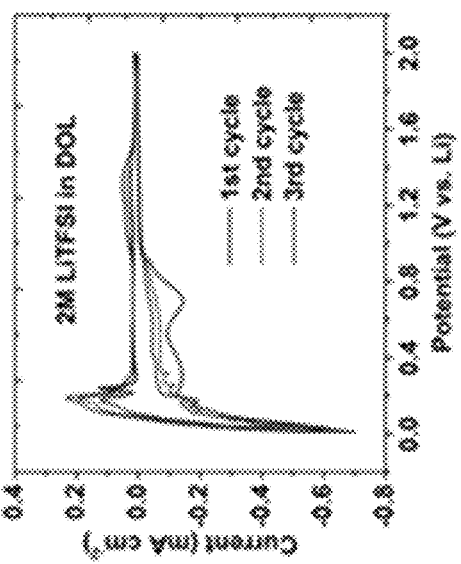
FIG. 13

FIG. 14
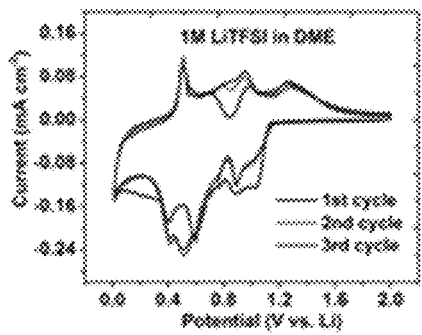
FIG. 14a
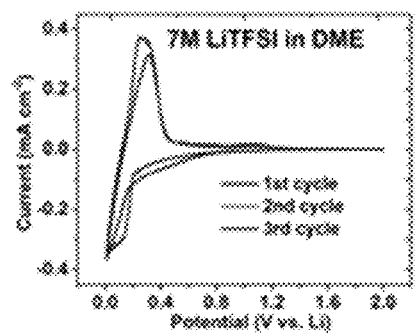
FIG. 14b
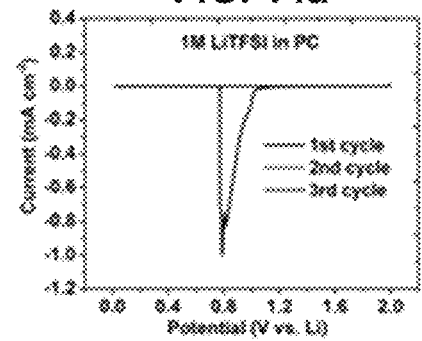
FIG. 14c
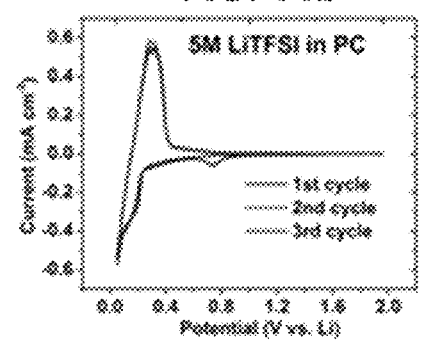
FIG. 14d
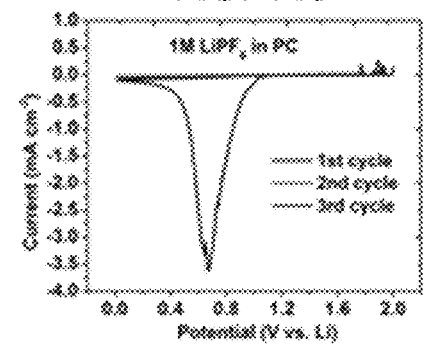
FIG. 14e
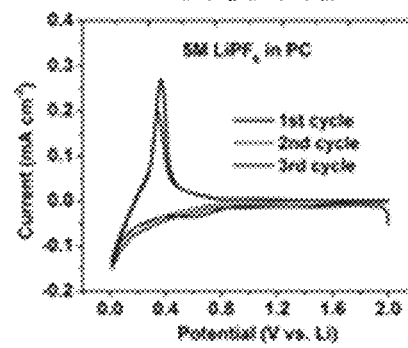
FIG. 14f
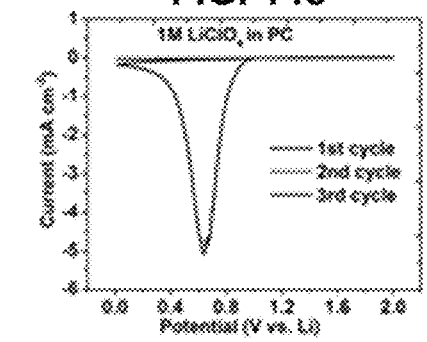
FIG. 14g
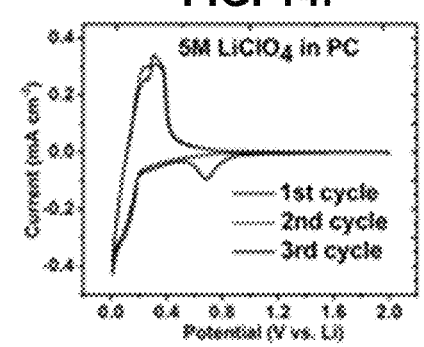
FIG. 14h FIG. 16
FIG. 16a
FIG. 16b
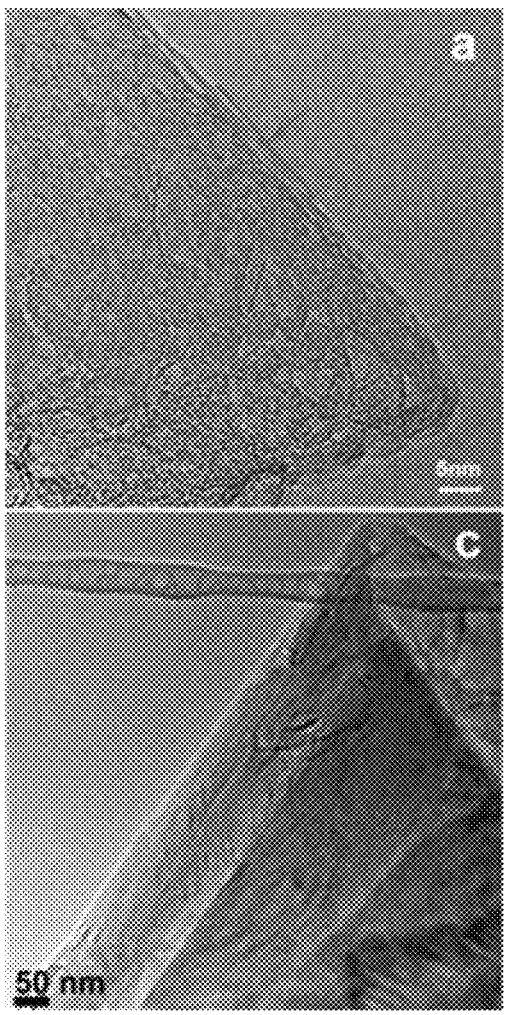
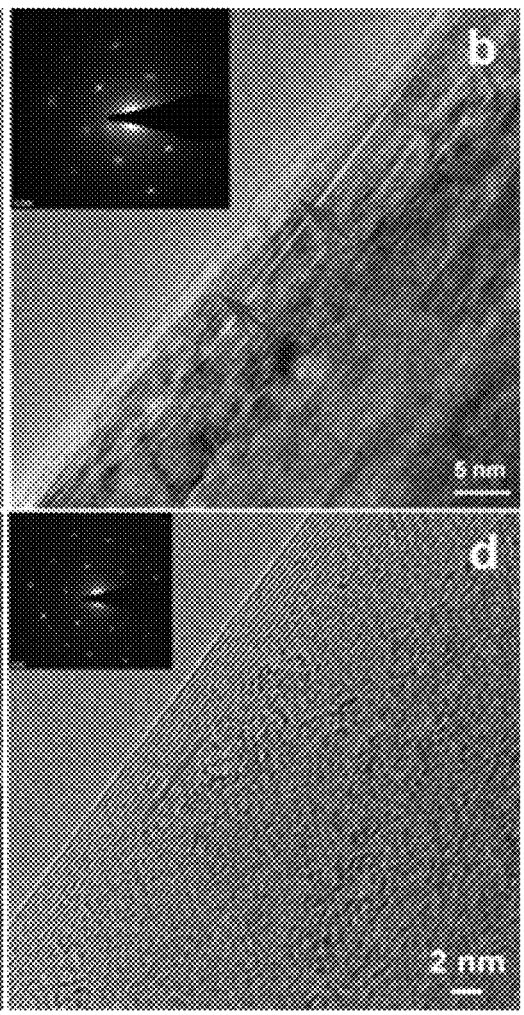
FIG. 16c
FIG. 16d

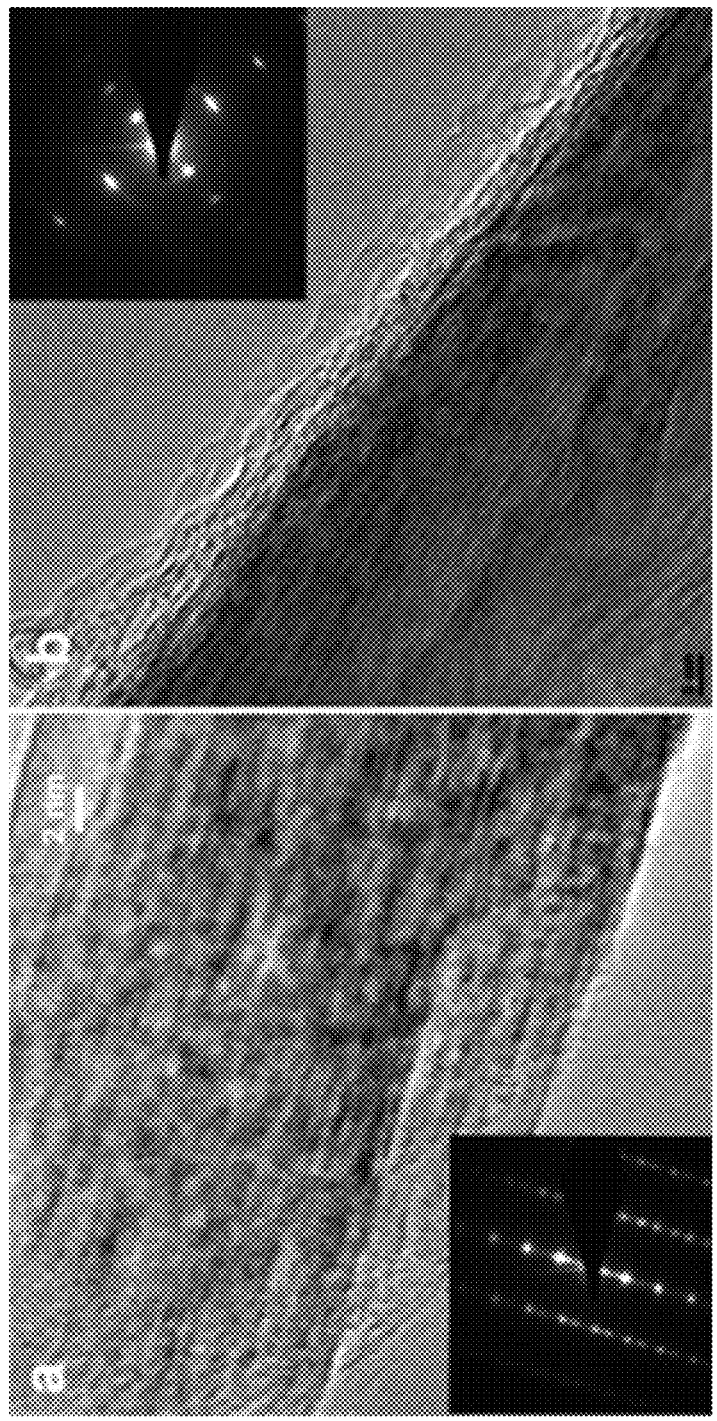

FIG. 18
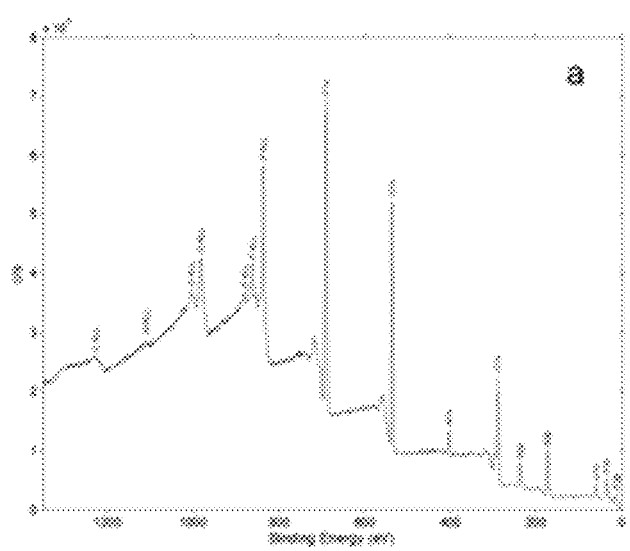
FIG. 18a
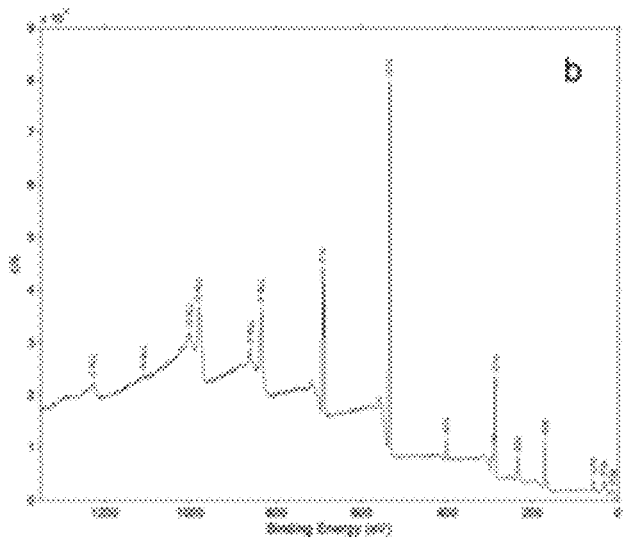
FIG. 18b
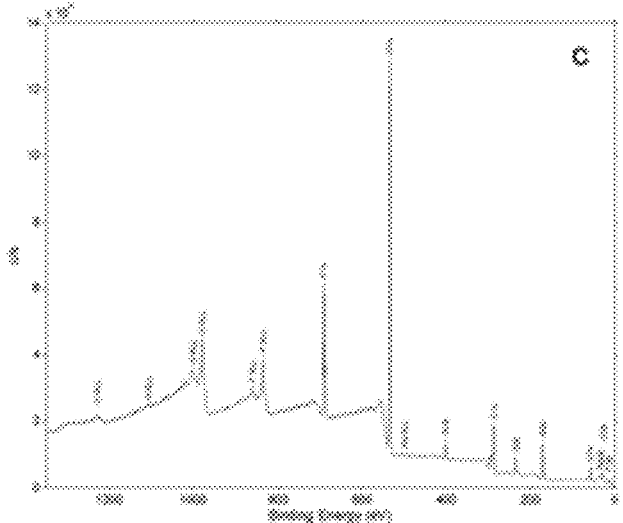
FIG. 18c

FIG. 19

FIG. 20
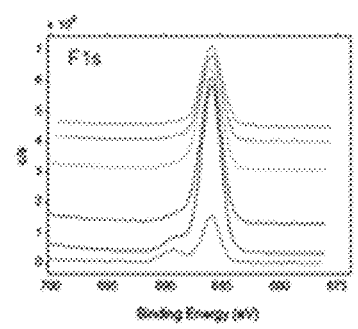
FIG. 20a
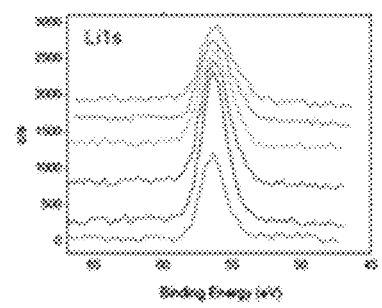
FIG. 20b
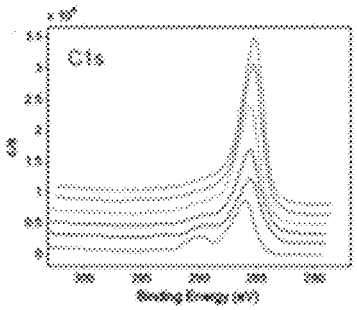
FIG. 20c
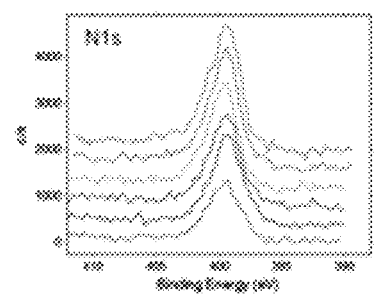
FIG. 20d
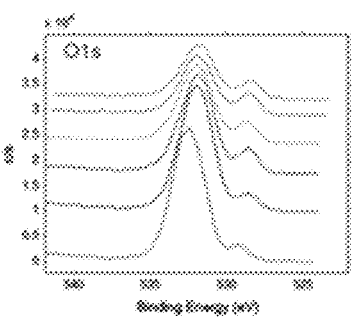
FIG. 20e
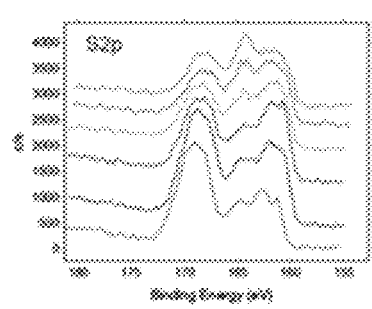
FIG. 20f

FIG. 21

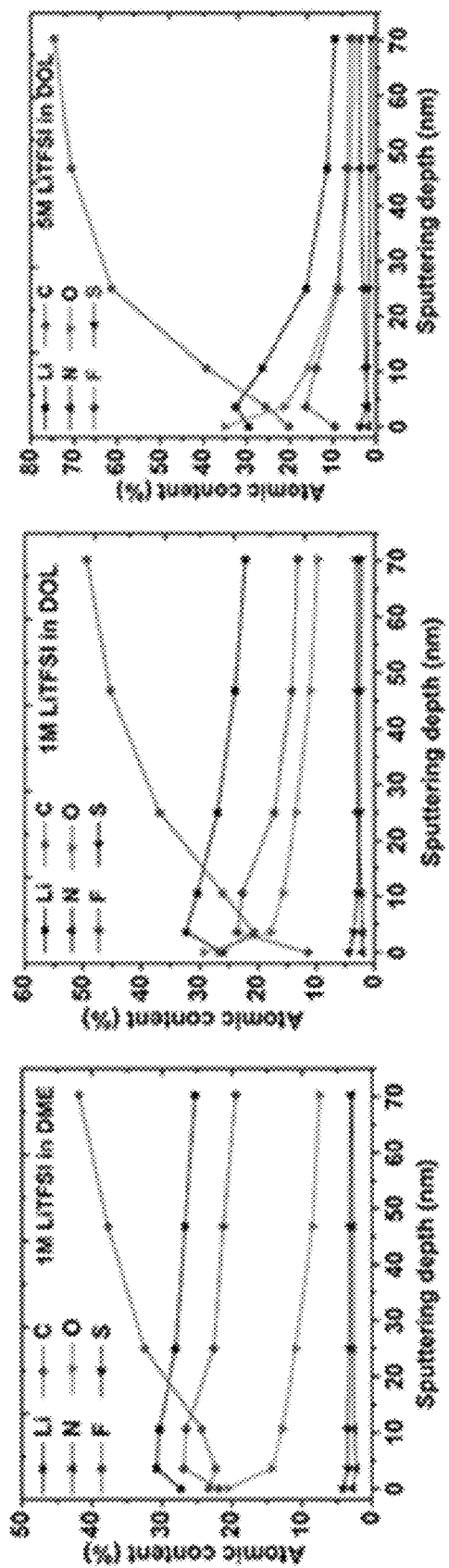

FIG. 23
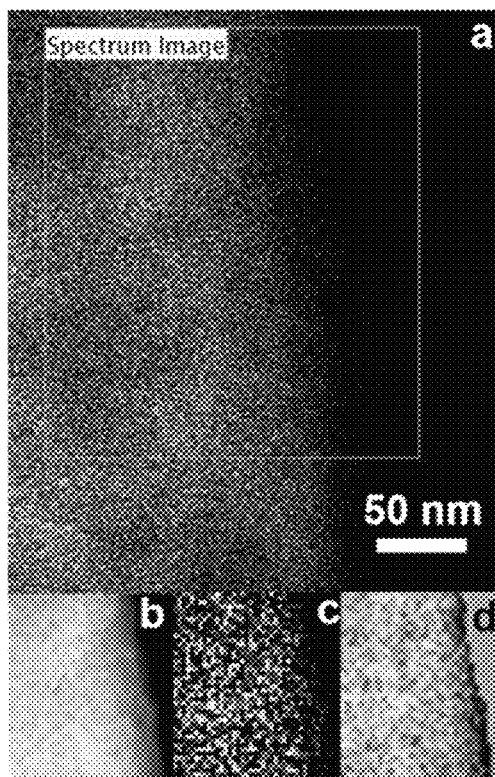
FIG. 23a
FIG. 23b   FIG. 23c   FIG. 23d
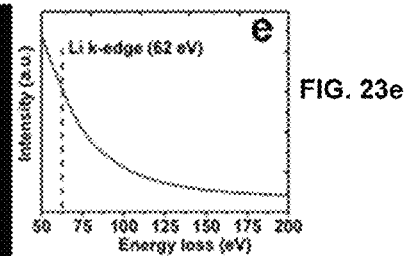
FIG. 23e
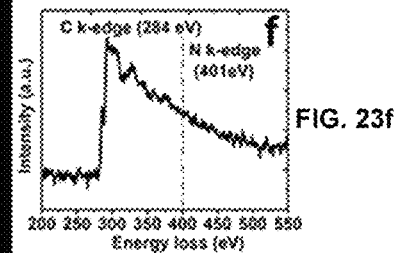
FIG. 23f
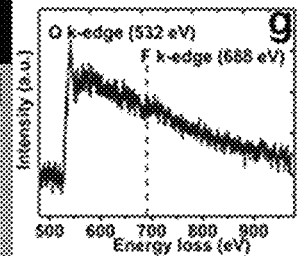
FIG. 23g

ELECTROLYTE FOR BATTERIES WITH REGENERATIVE SOLID ELECTROLYTE INTERFACE

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

BACKGROUND

With growing public concern about environmental and energy issues, considerable effort has been devoted to further development of electrochemical energy-storage technologies. Anode materials for such battery systems are one key area of interest. While graphite has been commonly used as anode material for certain state-of-the-art lithium-ion batteries, it has not been used in lithium-sulfur (Li—S) type energy storage systems such as battery systems due to the need to use ethylene carbonate electrolytes with graphite-material anodes. Carbonated-based electrolytes, such as those including an ethylene carbonate (EC) solvent, cannot be used in lithium-sulfur battery systems due to the interactions of alkyl carbonates and the dissolved polysulfide species in these lithium-sulfur type energy storage systems.

Ether-containing electrolyte compositions such as lithium bis(trifluoromethanesulphonyl) imide ($LiN(SO_2CF_3)_2$, LiTFSI) salt in 1,3-dioxolane (DOL)/1,2-dimethoxyethane (DME) mixed solvent is commonly used for Li—S batteries. However, a graphite anode in a LiTFSI salt in DOL/DME mixed solvent electrolyte composition cannot be cycled. Thus, it is generally believed that DOL is an undesirable electrolyte composition solvent for graphite anode cycling in a Li—S battery system.

SUMMARY

Disclosed herein is an energy storage device comprising:
an anode; and
a solute-containing electrolyte composition wherein the solute concentration in the electrolyte composition is sufficiently high to form a regenerative solid electrolyte interface layer on a surface of the anode only during charging of the battery system, wherein the regenerative layer comprises at least one solute or solvated solute from the electrolyte composition.

In certain embodiments, the energy storage device is a lithium-ion sulfur battery system, a lithium asymmetric super capacitor, a sodium-ion battery system, or a magnesium-ion battery system.

Also disclosed herein is a battery device comprising:
an anode comprising graphite;
a cathode comprising sulfur; and
an electrolyte composition selected from:
(i) a solute comprising lithium bis(trifluoromethanesulphonyl) imide and a solvent comprising 1,3-dioxolane, wherein the solute concentration in the electrolyte composition is at least 3M, as measured by moles of solute divided by the volume of the solvent without considering the volume change of the electrolyte composition after dissolving the solute;
(ii) a solute comprising lithium bis(trifluoromethanesulphonyl) imide and a solvent comprising 1,2-dimethoxyethane, wherein the solute concentration in the electrolyte composition is at least 7M, as measured by moles of solute divided by the volume of the solvent without considering the volume change of the electrolyte composition after dissolving the solute; or
(iii) a solute selected from lithium bis(trifluoromethanesulphonyl) imide, $LiPF_6$, or $LiClO_4$, and a solvent comprising propylene carbonate, wherein the solute concentration in the electrolyte composition is at least 5M, as measured by moles of solute divided by the volume of the solvent without considering the volume change of the electrolyte composition after dissolving the solute.

Further disclosed herein is a method comprising:
cycling a battery system comprising an anode and a solute-containing electrolyte composition; and
forming a regenerative layer on a surface of the anode only during charging of the battery system, wherein the regenerative layer comprises at least one solute from the electrolyte composition.

The foregoing will become more apparent from the following detailed description, which proceeds with reference to the accompanying figures.

BRIEF DESCRIPTION OF THE DRAWINGS

FIGS. 1a1-1d2 are cyclic voltammetry (CV) scans of graphite with Li counter and reference electrode in different electrolyte solutions in voltage range of 0.01-2V at a speed of 0.05 $mVs^{-1}$ (FIG. 1a1) 1M $LiPF_6$ in EC/EMC, (FIG. 1a2) 5M $LiPF_6$ in EC/EMC, (FIG. 1b1) 1M $LiPF_6$ in PC, (FIG. 1b2) 5M $LiPF_6$ in PC, (FIG. 1c1) 1 M LiTFSI in PC, (FIG. 1c2) 5 M LiTFSI in PC, (FIG. 1d1) 1M LiTFSI in DOL, and (FIG. 1d2) 5M LiTFSI in DOL.

FIG. 2 shows the results of CV scans of graphite with Li counter and reference electrode in electrolyte 5M $LiPF_6$ in EC/EMC in voltage range of 0.4-2V at a speed of 0.05 $mVs^{-1}$.

(FIG. 4a) 1M $LiPF_6$ in EC/EMC, (FIG. 4b) 1M LiTFSI in DOL, (FIG. 4c) 1M $LiPF_6$ in PC and (FIG. 4d) 1M LiTFSI in PC.

FIGS. 5a-5d are HRTEM/TEM images and corresponding SAED of graphite electrode after 5 CV cycles in various electrolytes at a speed of 0.05 $mVs^{-1}$ between 0.01 and 2.0 V: (FIG. 5a) 5M $LiPF_6$ in EC/EMC, (FIG. 5b) 5M $LiPF_6$ in PC, (FIG. 5c) 5M LiTFSI in PC and (FIG. 5d) in 5M LiTFSI in DOL.

FIGS. 6a-6d depict an electrochemical evaluation of LG/S full-cells. (FIG. 6a) Charge/discharge curves of LG-S full cell at 0.1 and 0.5 C in 5M LiTFSI/DOL electrolyte and (FIG. 6b) corresponding cycling stability and Coulombic efficiency. (FIG. 6c) Charge/discharge curves of LG-S full cell at 0.1 C in 1M LiTFSI/DOL/DME with 0.1M $LiNO_3$ as additive and (FIG. 6d) corresponding cycling stability and Coulombic efficiency.

FIGS. 7a-7b are (FIG. 7a) Charge/discharge curves of Li—S in 5M LiTFSI/DOL electrolyte at 0.1 and 0.5 C and (FIG. 7b) corresponding cycling performance and Coulombic efficiency.

FIGS. 10a-10d is an electrochemical evaluation of Li-G half-cells. (FIG. 10a) first three CV scans Li-G at a speed of 0.05 mVs$^{-1}$ between 0.01 and 2.0 V in 5M LiTFSI/DOL electrolyte, (FIG. 10b) Charge/discharge curves of Li-G in 5M LiTFSI/DOL electrolyte at 0.1 C and corresponding rate performance (inset). (FIG. 10c) First three CV scans Li-G at a speed of 0.05 mVs$^{-1}$ between 0.01 and 2.0V in 1M LiTFSI/DOL/DME. (FIG. 10d) Charge/discharge curves of Li-G in 1M LiTFSI/DOL/DME at 0.1 C and corresponding rate performance (inset).

(FIG. 11a) 1M LiTFSI in DME, (FIG. 11b) 1M LiTFSI in DOL, (FIG. 11c) 3 M LiTFSI in DOL, (FIG. 11d) 5M LiTFSI in DOL and (FIG. 11e) pristine graphite.

(FIGS. 12a and 12b) 1M LiTFSI in DME, (FIGS. 12c and 12d) 1M LiTFSI in DOL, and (FIGS. 12e and 12f) 5 M LiTFSI in DOL.

FIGS. 13a-13d are CV scans of Li-G half-cells in DOL based electrolyte with different concentrations (FIG. 13a) 0.5M LiTFSI in DOL, (FIG. 13b) 1M LiTFSI in DOL, (FIG. 13c) 2 M LiTFSI in DOL and (FIG. 13d) 3M LiTFSI in DOL.

FIGS. 14a-14h are CV scans on graphite (Li-G half-cell) in various electrolytes: (FIG. 14a) 1M LiTFSI in DME, (FIG. 14b) 7M LiTFSI in DME, (FIG. 14c) 1 M LiTFSI in PC, (FIG. 14d) 5M M LiTFSI in PC, (FIG. 14e) 1 M LiPF$_6$ in PC, (FIG. 14f) 5 M LiPF$_6$ in PC, (FIG. 14g) 1 M LiClO$_4$ in PC and 5 M LiClO$_4$ in PC.

(FIG. 15a) TEM images and (FIG. 15b) HRTEM images and corresponding selected area electron diffraction (SAED).

FIGS. 16a-16d show the morphology of graphite after 5 CV cycles in various electrolytes (0.05 mVs$^{-1}$ within voltage range of 0.01-2.0 V): (FIG. 16a) HRTEM images of graphite electrodes cycled in 0.5M LiTFSI in DOL (FIG. 16b) HRTEM images and corresponding SAED of graphite cycled in 1M LiTFSI in DOL. (FIG. 16c) TEM image and (FIG. 16d) HRTEM and corresponding SAED of graphite cycled in 5M LiTFSI in DOL.

FIGS. 17a-17b show the morphology of graphite (FIG. 17a) TEM images and corresponding SAED of pristine graphite and (FIG. 17b) TEM images and corresponding SAED of graphite after 5 cycles in 1M LiPF$_6$ EC/EMC electrolyte (0.05 mVs-1 within voltage range of 0.01-2.0 V).

FIGS. 18a-18c show wide scan XPS spectrum on the surface of the graphite electrodes after 5 cycles in: (FIG. 18a) 1M LiTFSI in DME, (FIG. 18b) 1M LiTFSI in DOL, and (FIG. 18c) 5 M LiTFSI in DOL.

(FIG. 19a) F1s, (FIG. 19b) Li1s, (FIG. 19c) C1s, (FIG. 19d) N1S, (FIG. 19e) O1s and (FIG. 19f) S2p.

FIGS. 20a-20f are XPS depth files (from surface to 70.3 nm) of graphite electrode after 5 CV cycles in 1M LiTFSI DOL electrolytes (0.05 mVs$^{-1}$ within voltage range of 0.01-2.0 V): (FIG. 20a) F1s, (FIG. 20b) Li1s, (FIG. 20c) C1s, (FIG. 20d) N1S, (FIG. 20e) O1s and (FIG. 20f) S2p.

(FIG. 21a) F1s, (FIG. 21b) Li1s, (FIG. 21c) C1s, (FIG. 21d) N1S, (FIG. 21e) O1s and (FIG. 21f) S2p.

FIGS. 22a-22c XPS depth files of graphite electrodes after 5 CV cycles in various electrolytes (scans rate is 0.05 mVs$^{-1}$ within voltage range of 0.01-2.0 V): (FIG. 22a) 1M LiTFSI in DME, (FIG. 22b) 1M LiTFSI in DOL, (FIG. 22c) and (FIG. 22d) 5 M LiTFSI in DOL.

FIGS. 23a-23g are scanning transmission electron microscopic EELS (STEM-EELS) on graphite electrode after 5 cycles in 5 M LiTFSI/DOL electrolyte: (FIG. 23a) STEM image, (FIG. 23b) near-edge fine structures of C, (FIG. 23c) near-edge fine structures of O, (FIG. 23d) mapping of C, (FIG. 23e) mapping of O, and (FIG. 23f) mapping of C/O ratio.

DETAILED DESCRIPTION

Figure 1:
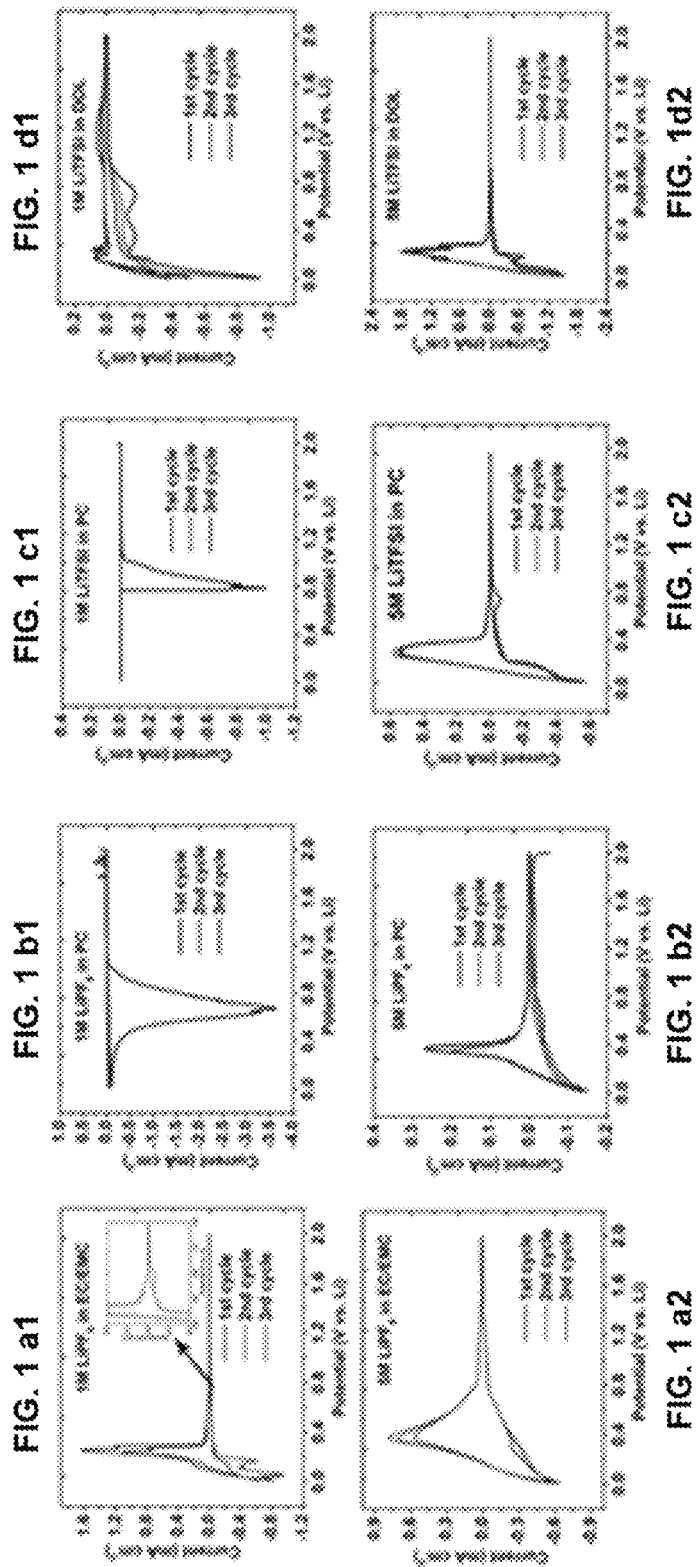

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought as known by those persons of ordinary skill in the art or limits of detection under standard test conditions/methods, as known to those persons of ordinary skill in the art. When directly and explicitly distinguishing embodiments from discussed prior art, the embodiment numbers are not approximates unless the word "about" is recited.

To facilitate review of the various embodiments of the disclosure, the following explanations of specific terms are provided:

Anode: An electrode through which electric charge flows into a polarized electrical device. From an electrochemical point of view, negatively-charged anions move toward the anode and/or positively-charged cations move away from it to balance the electrons arriving from external circuitry. In a discharging battery, such as the disclosed lithium/ion batteries or a galvanic cell, the anode is the negative terminal where electrons flow out. If the anode is composed of a metal, electrons that it gives up to the external circuit are accompanied by metal cations moving away from the electrode and into the electrolyte.

Anode active material: A material that is included in an anode and produces the electrons that flow out of the anode in a discharging battery.

Cell: As used herein, a cell refers to an electrochemical device used for generating a voltage or current from a chemical reaction, or the reverse in which a chemical reaction is induced by a current. Examples include voltaic cells, electrolytic cells, redox flow cells, and fuel cells, among others. A battery includes one or more cells. The terms "cell" and "battery" are used interchangeably only when referring to a battery containing a single cell.

Coin cell: A small, typically circular-shaped battery. Coin cells are characterized by their diameter and thickness. For example, a type 2325 coin cell has a diameter of 23 mm and a height of 2.5 mm.

An electrolyte: is a substance containing free ions that behaves as an electrically conductive medium. Electrolytes generally comprise ions in a solution, but molten electrolytes and solid electrolytes also are known.

Half-cell: As used herein, a half-cell is an electrochemical cell including a lithium metal negative electrode, another working electrode as the positive electrode, a separator, and an electrolyte.

Intercalation: A term referring to the insertion of a material (e.g., an ion, molecule, or group) between the atoms, molecules, or groups of another material. For example, lithium ions can insert, or intercalate, into graphite (C) to form lithiated graphite ($LiC_6$).

Specific capacity: A term that refers to capacity per unit of mass. Specific capacity may be expressed in units of mAh/g, and often is expressed as mAh/g carbon when referring to a carbon-based electrode.

Lithium batteries, such as lithium-ion batteries, typically comprise two components that participate in electrochemical reactions to produce energy: an anode and a cathode. Lithium-ion batteries produce energy through electrochemical reactions occurring between the anode and cathode. Typically both the anode and cathode are made of materials into which, and from which, lithium ions can intercalate and de-intercalate. During battery discharge, lithium ions de-intercalate from the anode material and migrate to the cathode into which they insert. During a charging cycle, the opposite reaction occurs, i.e., lithium ions are extracted from the cathode material and migrate back to the anode where they reinsert.

In a conventional lithium battery, charging occurs when lithium ions migrate from the cathode to the anode, as shown in the representative forward reactions below:

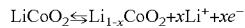  cathode half reaction:

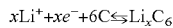  anode half reaction:

Discharge occurs when the reactions run in reverse.

Lithium or other metal alloy-based anodes for lithium batteries often exhibit poor cycle life and fast capacity fade that results from electrode cracking and pulverization due to the high volume change associated with lithium alloying and de-alloying processes with the anode during the charge and discharge cycles, respectively.

In non-alkyl carbonate (e.g., non-EC) based electrolyte battery systems (particularly ether-based electrolytes) used for cycling lithium-sulfur battery systems, many of the problems stem from use of lithium-metal or lithium-alloy based electrodes. Despite the problems encountered with Li-metal anodes, use of such anodes has persisted in lithium-sulfur battery systems for about the last 40 years. While graphite-material based anodes are commonly used for some types of lithium-ion battery systems, graphite (or graphite material based) anodes cannot be used in lithium-sulfur battery systems (or other sulfur chemistry energy storage systems such as capacitors) because ethylene-carbonates, needed to form an SEI layer on the graphite surfaces cannot be used in these types of lithium-sulfur chemistry systems.

Sulfur is attractive for energy storage as a cathode of Li/Li-ion batteries due to its low cost, high abundance, and above all 6-10 times higher theoretical specific capacity (1672 mAh/g) compared to state-of-the-art transition metal oxides and phosphates cathodes. Despite these attractive attributes of Li—S batteries, however, there are still challenges pertaining to the cathode, electrolyte and anode, which are typically associated with poor cycling stability, low Coulombic efficiency and potential safety concerns. In particular, most of these issues are related to the use of a lithium metal anode, which causes unavoidable polysulfides shuttle and continuous consumption of active sulfur species, and potentially leads to formation of unsafe Li dendrite. In addition, quick accumulation of a thick interphase on Li metal was found to be the direct and major reason for fast capacity decay of the batteries employing Li metal as anode, especially under conditions of high charge (Li deposition) rates.

A strategy to circumvent these problems is switching to anode materials other than Li metal. More specifically, due to the problems presented by Li-metal anodes in lithium-sulfur battery systems, the inventors attempted to use graphite anodes in a non-alkyl carbonate (such as a non-EC) containing electrolyte battery systems (particularly lithium-sulfur systems) despite the entrenched belief that graphite anodes could not be used in lithium-sulfur systems. Non-alkyl carbonate electrolytes, such as ether-based electrolytes, are required for use in lithium-sulfur systems because alkyl carbonate electrolytes, such as EC-containing electrolytes, interact with the dissolved polysulfide species in such systems. However, graphite electrodes without a passivation layer, such as an SEI film, are either not active in non-alkyl carbonate electrolyte battery systems or are susceptible to exfoliation based on the electrolytes used. Appropriate compounds such as EC have to be used in the electrolyte in lithium-ion battery systems to form a stable SEI film on the graphite anode surface, which only allows the insertion or deintercalation of $Li^+$. Otherwise, the compounds coordinated with $Li^+$ will co-intercalate into graphite layers of the anode and "exfoliate" the graphite structure leading to quick degradation and not allowing significant (greater than 50 cycles) battery or capacitor cycling without significant loss in specific capacity such that the device is not useful and/or economically useful as an energy storage device or system.

Intercalation-based anodes like graphite usually exhibit high cycling stability and efficiency for long term cycling and graphite has already been successfully commercialized in certain Li-ion batteries. Compared to conversion type anode materials or hard carbon, the backbones of layered carbon frameworks have very limited volume change upon $Li^+$ intercalation/deintercalation and enable stable interphase at the graphite surface, avoiding direct contact and continuous reactions between graphite and electrolyte species. However, it is impossible to utilize graphite in sulfur batteries directly before addressing the irreversibility issues of graphite, which is due to poor solid electrolyte interface (SEI) formation on graphite with ether-based electrolyte composition solvents such as 1,3-dioxolane (DOL), and 1,2-dimethoxyethane (DME).

The interfacial phenomenon has always been playing a critical role in energy storage technologies. A representative example can be found in SEI layers ubiquitously existing on the electrode surfaces in lithium ion batteries, which directly affects the charge transport, electrode stability and lifespan of the whole system. However, almost all SEI layers are unstable and accompanied by the continuous consumption of the electrolyte component, such as widely used fluoroethylene carbonate (FEC) with carbonate-based electrolytes and thus accumulation of cell impedance, which largely limits the long-term operation of the whole battery system.

Disclosed herein are electrolyte compositions that enable formation of a temporary SEI layer derived from the nucleation of electrolyte, such as solute and/or solvated solute from the electrolyte composition, on the anode surface, which prevents the decomposition of solvent at low potentials at which metal (e.g., Li) deposition or ion (e.g., Li) intercalation occurs. Once the electrical field is withdrawn, the "precipitated" nuclei of electrolyte solute and/or solvated solute re-dissolve in the electrolyte leading to a "clean" or "SEI-free" surface on the anode. Thus, the battery systems disclosed herein are characterized by the formation of a regenerative SEI layer that can form and dissolve (i.e., "regenerate") during each cycle over an extended period of at least 100 cycles, more particularly at least 300 cycles, and most particularly 800 cycle. This surprising finding was elicited by using various ethylene carbonate (EC)-free electrolyte compositions to enable the reversible cycling of graphite electrode, which is contrary to the current wisdom on the necessity of employing EC to form protective SEI layer on graphite surface to avoid the structure exfoliation caused by the electrolyte composition solvent co-intercalation.

The electrolyte compositions disclosed herein have a sufficiently high solute concentration to enable formation of the regenerative SEI layer. The minimum solute concentration for a specific solute/solvent couple for achieving the regenerative SEI layer is referred to herein generally as the "threshold concentration."

At the threshold concentration the electrolyte solute and/or solvated solute may preferentially nucleate on the anode surface, forming a dense "solute" layer to protect the anode surface from further reacting with the electrolyte composition solvent. Since this regenerative SEI is comprised mainly of "aggregated" solute nuclei or crystals under low voltages, it is re-dissolvable in the electrolyte composition once the voltage is withdrawn, leaving an extremely "clean" surface on the anode.

The regenerative SEI layer on the graphite electrodes, as used herein, functions as a protection layer (passivation layer), allowing the transport of Li ions within and throughout the graphite electrode without the co-intercalation of solvents in the electrolyte. The regenerative SEI layer exhibits lithium-ion conductivity but does not exhibit electron conductivity. The regenerative SEI layer also acts to inhibit graphite exfoliation.

Different combinations of solute and solvent function the same way at or above the threshold concentration. Although not bound by any theory, it is believed that the nucleation of the electrolyte solute and/or solvated solute under the electrical field forms a temporary SEI layer to isolate the reactive sites in the anode from electrolyte composition solvents. This widely applicable approach to the formation of regenerative solute-based SEI was tested by using graphite anode as a platform, which in general, displays very stable cycling in all kinds of EC-free electrolytes including $LiPF_6$ in PC, or LiTFSI in DOL and/or DME.

In general, there are two main species present in the electrolyte composition: solute and solvent. Therefore, under an electrical field, two processes should occur concurrently—solute nucleation and solvent decomposition on the anode surface. However, commonly used electrolyte compositions have a salt concentration of about 1 M or less and fall into the range of "diluted" solutions. Thus the influence of the electrical field on the possible crystallization of electrolyte solute is not observable. Accordingly, SEI components are mainly derived from solvent decomposition in diluted electrolyte compositions, although its complete formation is still unclear. On the other hand, if the concentration of solvent in the electrolyte is significantly decreased (e.g., in supersaturated solutions), the nucleation of solute at low potentials may be amplified and even become competitive with the solvent decomposition process due to the largely reduced amount of solvent molecules.

Accordingly, disclosed herein are energy storage devices that include a solvent and a threshold concentration of at least one solute. Illustrative energy storage devices include a lithium-ion sulfur battery system, a lithium asymmetric super capacitor, a sodium-ion battery system, or a magnesium-ion battery system.

One embodiment of the energy storage devices are lithium-ion sulfur battery systems or lithium-sulfur battery systems that include a threshold concentration of at least one solute and a non-EC solvent. As such, after about 40 years of having to use trouble-ridden lithium-metal anodes in such systems, particularly lithium-sulfur battery systems, the preferred graphite anode can be used. In addition, greatly improved cycling stability was observed on a Li—S battery when utilizing the electrolyte composition disclosed herein. In certain embodiments the energy storage systems such as the lithium-ion sulfur or lithium-sulfur battery systems include a sulfur cathode.

Stable cycling was demonstrated using a graphite anode in ether-based electrolytes, which otherwise cannot be recharged at all.

Chemical processes in a lithium-ion sulfur battery as disclosed herein include lithium dissolution from the anode surface (and incorporation into alkali metal polysulfide salts) during discharge, and reverse lithium plating to the anode while charging. (This contrasts with conventional lithium-ion cells, where the lithium ions are intercalated in the anode and cathodes.) Each sulfur atom can host two lithium ions delivering high theoretical gravimetric capacity of 1675 mAh/g. Typically, lithium-ion batteries accommodate only 0.5-0.7 lithium ions per host molecule unit with practical specific capacities of 140-180 mAh/g. Consequently lithium-ion sulfur systems allow for a much higher lithium storage density. Polysulfides are reduced on the cathode surface in sequence while the cell is discharging:

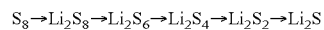
$$S_8 \rightarrow Li_2S_8 \rightarrow Li_2S_6 \rightarrow Li_2S_4 \rightarrow Li_2S_2 \rightarrow Li_2S$$

Across a porous diffusion separator, sulfur polymers form at the cathode as the cell charges:

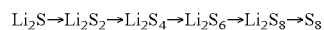
$$Li_2S \rightarrow Li_2S_2 \rightarrow Li_2S_4 \rightarrow Li_2S_6 \rightarrow Li_2S_8 \rightarrow S_8$$

In one embodiment a battery system comprises an electrolyte composition as disclosed herein, an anode such as a graphite anode for a lithium-ion sulfur battery, a cathode, such as a sulfur-based cathode and a separator or membrane. The battery system may further include a current collector.

Illustrative solutes for use in the electrolyte compositions for lithium-ion sulfur batteries disclosed herein include lithium bis(trifluoromethanesulphonyl) imide (LiN(SO$_2$CF$_3$)$_2$, LiTFSI), lithium bis(fluorosulfonyl)amide (LiFSI), Lithium trifluoromethanesulfonate (Li triflate), (lithium 4,5-dicyano-2-(trifluoromethyl) imidazole (LiTDI), LiPF$_6$, LiClO$_4$, LiAsF$_6$, LiBF$_4$, or a mixture thereof.

Illustrative solvents for use in the electrolyte compositions for lithium-ion sulfur batteries disclosed herein include ether solvents such as dimethyl ether, 1,2-dimethoxyethane (DME), 1,3-dioxolane (DOL), diethylene glycol dimethyl ether (diglyme), triethylene glycol dimethyl ether (triglyme), tetra ethylene glycol dimethylether (tetraglyme), sulfur solvents such as dimethyl sulfoxide (DMSO), or sulfone, carbonate solvents such as dimethyl carbonate, ethyl methyl carbonate, diethyl carbonate, propylene carbonate, or binary or ternary mixtures thereof.

In particular embodiments, the electrolyte compositions consists essentially of, or consists of, only the solute and the solvent.

In particular embodiments, the electrolyte composition comprises, consists essentially of, or consists of LiTFSI solute and DOL solvent.

In particular embodiments, the solvent is pure DOL.

In particular embodiments, the graphite electrode comprises, consists essentially of, or consists of, a graphite-material based electrode, such as a pure or substantially pure graphite material electrode or a graphite composite-based electrode, such as a mixture of graphite, carbon conductors such as carbon black, carbon nanotubes, carbon nanofiber, graphene, or reduced graphene oxide and a binder such as polyvinylidene fluoride (PVDF), carboxymethyl cellulose (CMC), styrene-butadiene rubber (SBR), polyacrylic acid (PAA), or Li-polyacrylic acid (Li-PAA). The carbon conductor and binder are used to prepare the electrode but do not contribute to the capacity of the graphite electrode and as such may be considered along with other common additives as components described by the language "consisting essentially of." Other graphite-based electrode composite materials may be used, such as graphite/Li, graphite/SiO$_x$, graphite/Si, graphite/Sn, graphite/MO$_x$, (M: Ti, V, Cr, Fe, Co, Ni, Cu, Zn, Ge, and Sn), which may also be used as anodes for lithium-sulfur batteries. For ease of discussion, certain embodiments are disclosed using the language "graphite anode" or "graphite electrode" but should be understood to include the graphite-mixed anode or electrode materials noted above unless the terms "pure graphite" or "substantially pure graphite" are used. A "pure graphite" anode or electrode refers to those made essentially exclusively or exclusively of graphite, to the ability for conventional means to produce the same, but does not include the graphite-mixed anode materials alternatives noted above or other conventional materials added to graphite anodes.

The sulfur cathode for use in lithium-ion sulfur batteries comprises, consists essentially or, or consists of, a sulfur material such as S, polysulfides Li$_2$S$_x$ (x=1-8)), and/or sulfur-containing polymers. The sulfur cathode may also include conductors such as carbon black, porous carbon, carbon nanotube, carbon nanofiber, graphene, reduced graphene oxide, metal powders, metal frameworks, metal fibers, conductive polymers, and their binary or ternary mixtures, or mixtures thereof.

Illustrative solutes for use in the electrolyte compositions for sodium-ion batteries disclosed herein include NaPF$_6$, NaBF$_4$, NaCF$_3$SO$_3$, NaN(SO$_2$CF$_3$)$_2$, NaAsF$_6$, NaSbF$_6$, NaAlCl$_4$, NaClO$_4$, and mixture thereof.

Illustrative solvents for use in the electrolyte compositions for sodium-ion batteries disclosed herein include ether solvents such as dimethyl ether, 1,2-dimethoxyethane (DME), 1,3-dioxolane (DOL), diethylene glycol dimethyl ether (diglyme), triethylene glycol dimethyl ether (triglyme), tetra ethylene glycol dimethylether (tetraglyme), sulfur solvents such as dimethyl sulfoxide (DMSO), or sulfone, carbonate solvents such as dimethyl carbonate, ethyl methyl carbonate, diethyl carbonate, propylene carbonate, or binary or ternary mixtures thereof.

Illustrative cathodes for use in the sodium-ion batteries disclosed herein include Na$_x$MO$_2$ (M=V, Cr, Mn, Fe, Co, Ni, x=0-1); NaMPO$_4$ (M=Ti, V, Fe, Mn, Co, Ni); NaMn$_x$M$_{1-x}$PO$_4$ (M=Fe, Ca, Mg; x=0-1); Na$_2$MP$_2$O$_7$ (M=V, Cr, Mn, Co, Fe, Ni); Na$_x$M$_2$(PO$_4$)$_3$ (M=Ti, V, Fe, Mn, Co, Ni; x=0-3); MF$_3$ and NaMF$_3$ (M=Ni, Fe, Mn); Na$_x$MPO$_4$F (M=Mn, Fe, Co, Ni; x=0-2); Prussian blue and its analogues A$_x$MFe(CN)$_6$ (A=K, Na; M=Ni, Cu, Fe, Mn, Co and Zn; x=0-4); organic tetracyanoethylene (TCNE); and Aniline-nitroaniline copolymer.

Illustrative anodes for use in the sodium-ion batteries disclosed herein include graphite; soft carbon; hard carbon; TiO$_2$; Li[Li$_{1/3}$Ti$_{5/3}$]O$_4$, Na$_2$Ti$_3$O$_7$, NaTi$_2$(PO$_4$)$_3$, Na-M alloy (M=Sn, Pb, Bi, Si, Ge, As, Sb, P); organic disodium terephthalate (Na$_2$C$_8$H$_4$O$_4$); and dilithium rhodizonate (Li$_2$C$_6$O$_6$).

Illustrative solutes for use in the electrolyte compositions for magnesium-ion batteries disclosed herein include Mg(ClO$_4$)$_2$, Mg(TFSI)$_2$, RMgX (R=alkyl, aryl groups, and X=halides: Cl, Br), Mg(AX$_{4-n}$R$_n$R'$_{n''}$)$_2$ (A=Al, B; X=Cl, Br; R, R'=alkyl or aryl groups, and n'+n''=n), Mg(AX$_{4-n}$R$_n$)$_2$ (A=Al, B, Sb, P, As, Fe, and Ta; X=Cl, Br, and F; and R=butyl, ethyl, phenyl, and benzyl (Bu, Et, Ph, and Bz, respectively), and mixtures thereof.

Illustrative solvents for use in the electrolyte compositions for magnesium-ion batteries disclosed herein include ether solvents such as dimethyl ether, 1,2-dimethoxyethane (DME), 1,3-dioxolane (DOL), diethylene glycol dimethyl ether (diglyme), triethylene glycol dimethyl ether (triglyme), tetra ethylene glycol dimethylether (tetraglyme), tetrahydrofuran, and 2-methyl tetrahydrofuran; sulfur solvents such as dimethyl sulfoxide (DMSO), or sulfone; carbonate solvents such as dimethyl carbonate, ethyl methyl carbonate, diethyl carbonate, propylene carbonate, or binary or ternary mixtures thereof.

Illustrative cathodes for use in the magnesium-ion batteries disclosed herein include Chevrel phase Mo$_6$T$_8$ (T=S, Se, Te), mixed Chevrel phases (Mo$_6$S$_{8-y}$Se$_y$; y=1,2), Cu$_x$Mo$_6$S$_8$ (x=0-1), V$_2$O$_5$, TiS$_2$, V$_6$O$_{13}$, MnO$_2$, WO$_3$, MoO$_3$, U$_3$O$_8$, MgxMnO$_4$ (X=0-1), Mg$_x$Co$_2$O$_4$ (X=0-1), MgxNi$_2$O$_4$ (X=0-1), MgMSiO$_4$ (M=Mn, Co, Fe), TiS$_2$, MoS$_2$, WSe$_2$, and sulfur.

Illustrative anodes for use in the magnesium-ion batteries disclosed herein include graphite; soft carbon; hard carbon; TiO$_2$; Li[Li$_{1/3}$Ti$_{5/3}$]O$_4$, Na$_2$Ti$_3$O$_7$, NaTi$_2$(PO$_4$)$_3$, Na-M alloy (M=Sn, Pb, Bi, Si, Ge, As, Sb, P); organic disodium terephthalate (Na$_2$C$_8$H$_4$O$_4$); and dilithium rhodizonate (Li$_2$C$_6$O$_6$).

The threshold solute concentration varies depending upon the specific solute and the specific solvent. In certain embodiments, the threshold solute concentration is at least 3M, more particularly at least 4 M, and most particularly at least 5 M, as measured by moles of solute divided by the volume of the solvent without considering the volume change of the electrolyte after dissolving the solute. For example, in an embodiment in which the solute is lithium bis(trifluoromethanesulphonyl) imide and the solvent is 1,3- dioxolane the threshold solute concentration is at least 3M, more particularly at least 4 M, and most particularly at least 5 M, as measured by moles of solute divided by the volume of the solvent without considering the volume change of the electrolyte after dissolving the solute. In an embodiment in which the solute is lithium bis(trifluoromethanesulphonyl) imide and the solvent is 1,2-dimethoxyethane, the threshold solute concentration is at least 7M, as measured by moles of solute divided by the volume of the solvent without considering the volume change of the electrolyte after dissolving the solute. In an embodiment in which the solute is selected from lithium bis(trifluoromethanesulphonyl) imide, $LiPF_6$, or $LiClO_4$, and the solvent is propylene carbonate, the threshold solute concentration is at least 5M, as measured by moles of solute divided by the volume of the solvent without considering the volume change of the electrolyte after dissolving the solute.

Examples

Figure 2:
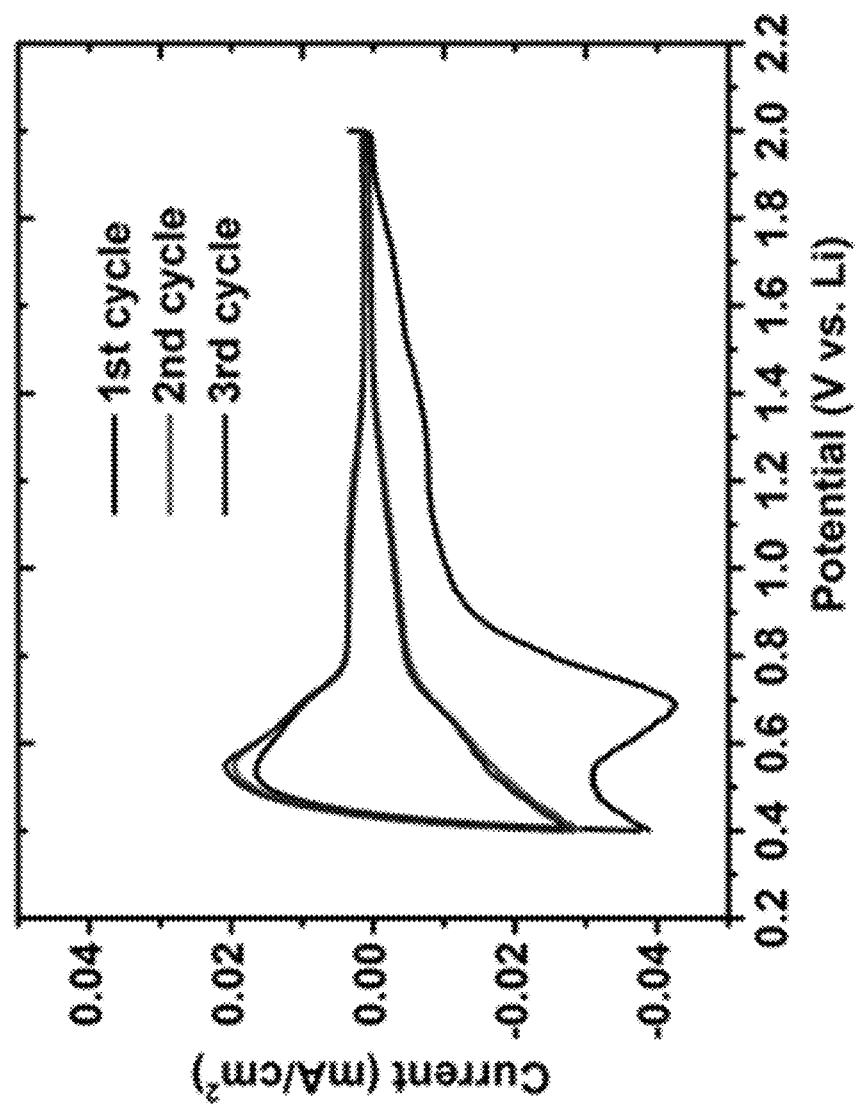

A series of various electrolytes with different concentrations were prepared. Graphite was selected as the standard anode to investigate the interfacial activities in different solutions because of the well-understood electrochemistry of graphite electrode that employs intercalation chemistry. FIGS. 1a1-1d2 compare the cyclic voltammetry of graphite within 0-2.0 V in different electrolytes. When the standard electrolyte e.g. 1M $LiPF_6$ in EC/EMC is used (FIG. 1a1), a small reduction peak at ca.0.8 V is usually observed. It has been well documented that this irreversible peak corresponds to the intercalation of solvated $Li^+$ ion into graphite layers, followed immediately by the EC decomposition on graphite surface and formation of SEI layer which occurs via secondary or chemical reduction. Once the SEI is formed, the intercalation of solvated $Li^+$ ions stop thus a reduction peak is observed at 0.8 V. As the potential lowers to ca. 0.2 V, $Li^+$ ions, de-solvated by SEI, begin to intercalate/de-intercalate reversibly in/out of the graphite lattice, which undergoes multiple phase transitions, as reflected by the typical redox peaks between 0-0.4 V in FIG. 1a1. When $LiPF_6$ concentration is increased (FIG. 1a2), the response current begins to increase from 0.8 V and a broad reduction peak was formed at 0.4 V during the first cycle. This broad reduction peak and its corresponding oxidation peak between 0.6-0.8 V can be assigned to the reversible intercalation of solvated $Li^+$ ions. EC decomposition should be minimum, if any, within this range since this redox peaks occur in the subsequent cycles as well. To confirm that EC decomposition is not a main contributor in this peak, CV test in 5M $LiPF_6$ (EC/EMC) was re-run within 0.3 and 2 V, which clearly shows reversible redox reactions (FIG. 2). If EC-derived SEI is not forming or is incompletely forming, $Li^+$ desolvation should not occur not to mention the reversible intercalation/deintercalation in the graphite host. However, in FIG. 2, the reduction peak of graphite lithiation still occurs, although merged into one broad peak between 0.2 and 0 V due to the increased viscosity of the concentrated electrolyte. The oxidation peak for graphite delithiation also shows a single peak at around 0.4 V for the same reason. This means a protecting film still forms but may not be produced by EC molecules, which will be further discussed in detail.

The solvent was switched to PC (FIG. 1b1), which is known to be incompatible with graphite. FIG. 1b1 shows that in 1M $LiPF_6$ in PC, a large reduction peak at ca. 0.7 V, corresponding to the intercalation of PC-solvated $Li^+$ ions, followed by PC decomposition. However, PC-derived SEI cannot form an effective protecting layer. Thus co-intercalation of solvated $Li^+$ continues to enter the graphite lattice, consistent with the very large response cathodic current. Once the layered structure of graphite is completely exfoliated, the reaction is terminated. Not surprisingly, there is no following redox peak of $Li^+$ interaction/deintercalation within graphite. Interestingly, when the concentration of $LiPF_6$ in PC is increased to 5M (FIG. 1b2), the irreversible reduction peak at 0.8 is significantly reduced meaning that the intercalation of solvated $Li^+$ ends quickly once started. Since PC cannot form a good SEI on graphite surface, this protecting layer should form from other sources. Otherwise the process will not stop so quickly. More importantly, the reversible redox reaction between the "de-solvated" $Li^+$ ions and the graphite show up in the CV, strongly indicating that the unknown protecting film has exactly the same function of EC-derived SEI, although there is no EC existing in the electrolyte at all. At a first glance, the other potential source of forming the SEI is the anion e.g. $PF_6^-$. So the salt was switched to LITFSI in FIG. 1c1. When 1M LiTFSI in PC is tested, the same exfoliation of graphite is seen due to the non-existence of the effective SEI. Surprisingly, when the concentration of LITFSI is increased to 5M, again the same reversible intercalation/de-intercalation of desolvated $Li^+$ in the graphite host is observed. The comparison of FIGS. 1b2 and 1c2 demonstrate that anion in the electrolyte is not the main contributor of the protecting SEI.

LiTFSI is further tested in pure DOL (FIG. 1d) which is not a common electrolyte for traditional Li-ion batteries. When 1M LiTFSI in DOL is used, there are two irreversible reduction peaks seen during the first cathodic scan. The first on at ca.0.8 V again reflects the intercalation of DOL-solvated $Li^+$ ions in graphite. The second small reduction peak at ca. 0.4 V corresponds to the decomposition of DOL which is known to be stable until below 0.6 V. It seems that DOL-derived SEI, although not as effective as the EC-generated one, somehow protects the graphite surface to a certain degree and also allows partial reversible cycling of graphite within limited cycles. However, the important surprising finding is the when the concentration of LiTFSI is increased to 5M in DOL, the completely reversible intercalation/deintercalation of desolvated $Li^+$ within graphite structure is demonstrated again, very similar as in all other concentrated electrolytes discussed earlier. A closer inspection on FIG. 1d2 further reveals that there is no peak corresponding to the intercalation of solvated $Li^+$ ions at 0.8 V, suggesting that a protecting film already forms before approaching 0.8 V. This is different with the CV curves in FIGS. 1b2 and 1c2, in which the intercalation of solvated $Li^+$ ions still happens from 0.8 V, followed by the formation of the protecting film. Additionally, there is no reduction peak for DOL decomposition at 0.4 V in FIG. 1d1. This further confirms that the preformed protecting film is not from DOL solvent, which already exists early in the beginning of cathodic scan. Of note, the redox peaks reflecting the Li-graphite interactions in concentrated LiTFSI in DOL is very similar as the one in 1M $LiPF_6$ in EC/EMC, the classical recipe to enable good cyclability of graphite. The redox peaks in FIG. 1d2 are well-differentiated although the electrolyte used is concentrated.

From the above discussion, it is clear that in various concentrated electrolytes, a protecting film forms but not from solvent molecules nor from the anion reduction. A few indications can be found in FIG. 1 on the properties of the protecting layer. First, from FIG. 1d2, it appears that the formation of this layer also does not need electron transfer since there is no peak at all before 0.2 V. Second, the time of forming this film seems to be more related with the solute in the concentrated electrolyte. For example, the CV shape in FIG. 1a2 is similar as in FIG. 1b2, both of which utilize LiPF$_6$ as the solute. CV curve in FIG. 1c2 is also closer to that of FIG. 1d2, where LiTFSI is used in both cases. Based on these observations, it appears that, in concentrated electrolytes and under an electrical field, the electrolyte solute will more easily nucleate and precipitate on the surface of electrode to form an effective protection layer, functioning the same or similar as a traditional SEI layer to desolvate Li$^+$ and preventing the further co-intercalation of solvent molecules. Because different salts have different responses to the electrical field and their precipitation constant also varies, the formation time of the solute-derived SEI is more determined by the nature of the electrolyte salts, which explains the similarities of CV shapes in the electrolyte with solute in common.

Figure 3:
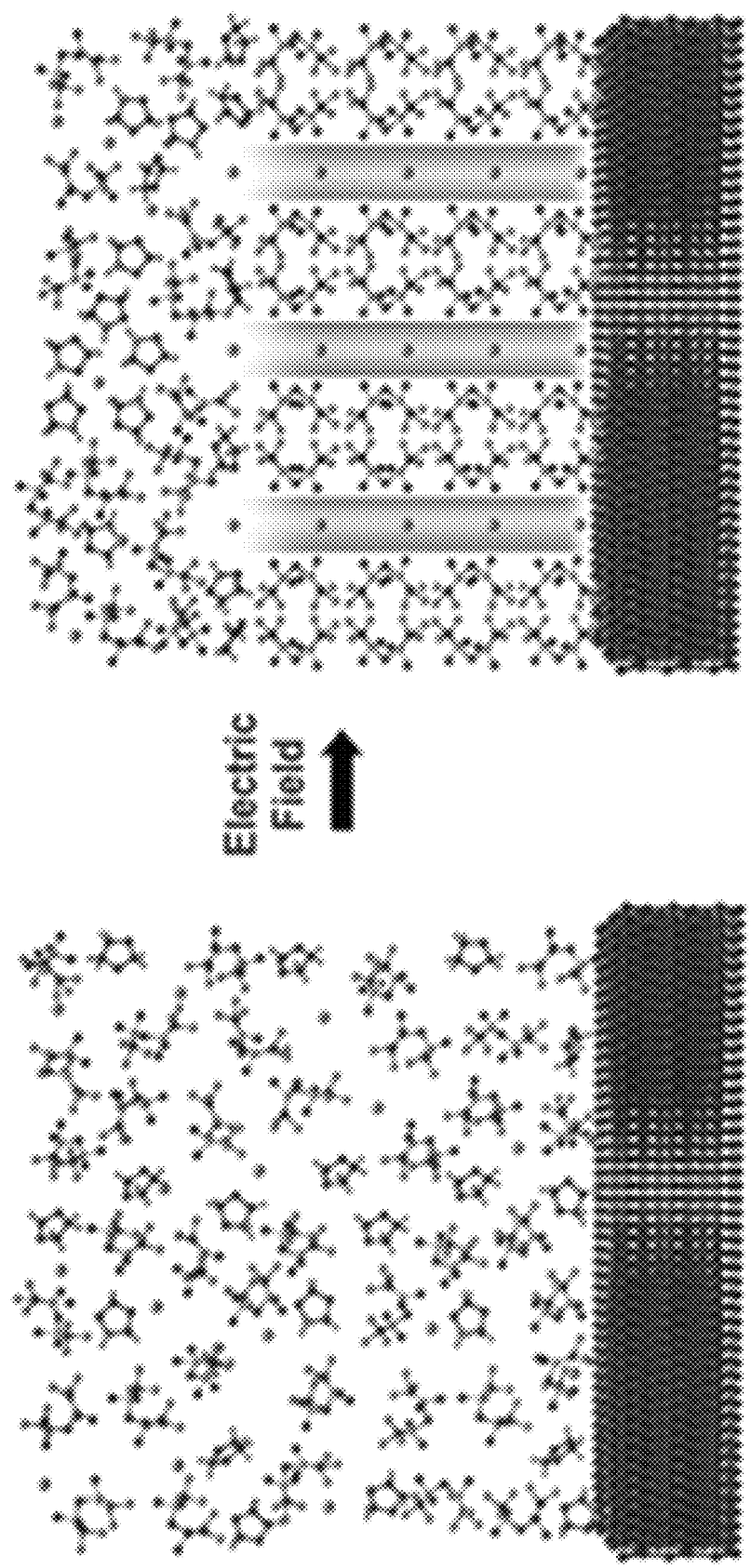
FIG. 3 is a schematic illustrating a proposed mechanism for a regenerative solid electrolyte interface (SEI) as disclosed herein.

The proposed mechanism for the SEI formation is illustrated in FIG. 3 by using 5 M LiTFSI in DOL as an example. Once the electrical field is applied, the nuclei of LiTFSI aggregate/precipitate together on the graphite surface forming a "dense" layer to prevent contact between solvent and the electrode. Li$^+$ ion still can transport through the lattice. Of note, although the decreased amount of solvent molecule in concentrated electrolyte reduces the chances of the undesired solvent decomposition (if it is not EC), a SEI layer still has to be formed in the concentrated electrolyte. Otherwise, the co-intercalation of the solvent molecules in the graphite lattice will quickly destroy the host structure leading to the end of cycling, which is obviously not the case and will be discussed later by using the cycling data.

Figure 4:
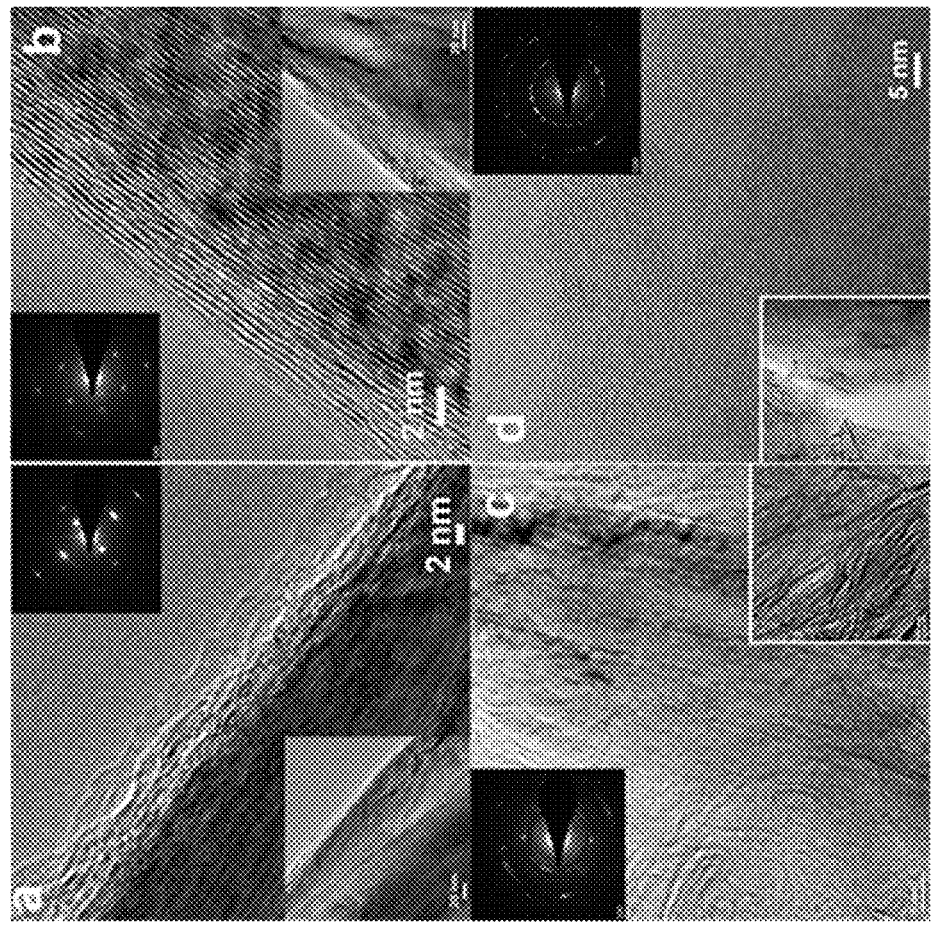
FIGS. 4a-4d are HRTEM/TEM images and corresponding SAED of graphite electrode after 5 CV cycles at a speed of 0.05 $mVs^{-1}$ between 0.01 and 2.0 V in various electrolytes.

Based on the proposed SEI formation mechanism, if the electrical field is withdrawn, the precipitated solute should re-dissolve in the electrolyte, leaving a clean surface on the graphite electrode. To validate this hypothesis, the TEM images of graphite cycled in all different electrolytes are compared in FIG. 4. Regardless of the solute and solvent, in all electrolytes with 1M concentration, clear SEI layers are seen. For those tested in PC solvent, large exfoliation of graphite is also observed. In DOL-based electrolyte, the layered structure of graphite is relatively maintained better than in PC and a surface film formed from DOL decomposition is clear, consistent with the CV explanation in FIG. 1d1. However, in all concentrated electrolytes, on the other hand, the graphite surface is surprisingly clean without any indication of polymer films (FIG. 5). The TEM characterization was repeated for a few times by using different concentrated electrolytes which all show the same "clean" surface. This finding further confirms our hypothesis that the SEI formed in concentrated electrolytes is a temporary protection layer induced by the electrical field comprised of original solute, which re-dissolve/disappear without the electrical field. Further, compared with graphites cycled in LiTFSI-based concentrated electrolytes (FIGS. 5c and 5d), those cycled in LiPF$_6$ (FIGS. 5a and 5b) show slightly expanded lattice, confirming that the reversible intercalation of solvated Li$^+$ at the beginning of the negative scan happened due to the later formation of solute-derived SEI, while in LiTFSI the SEI layer from earlier due to their different salt properties.

Feasibility of the strategy of using intercalation anode to address the issues of conventional Li—S battery was demonstrated by constructing a full cell with lithiated graphite as anode combined with sulfur cathode (LG/S). Surprisingly, promising electrochemical properties (FIG. 6) was achieved for LG/S in 5M LiTFSI/DOL electrolyte in terms of reversible capacity, Coulombic efficiency and cycling stability, which are bottlenecks for state-of-the-art Li—S batteries. At a low rate of 0.1 C, the LG/S cell exhibits a high capacity of 980 mAhg$^{-1}$ with characteristic two discharge-plateaus at 2.2 and 2.0 V, respectively (FIG. 6a). This means sulfur in LG/S full cell experiences similar reaction pathways as those in conventional Li—S batteries. In the following first charging process, a capacity around 1080 mAhg$^{-1}$ was obtained, delivering a high Coulombic efficiency of 90.7% without observation of long shuttle plateau. It is noted that loading of the sulfur electrode used in our full cell is above 2 mg S cm$^{-2}$ and no additives like LiNO$_3$ was contained in the electrolyte. When cell was cycled at improved 0.5 C rate, a capacity as high as 815 mAhg$^{-1}$ was obtained, indicating good kinetics of Li$^+$ across the interphase or in bulk of electrolyte. In addition, it is interesting to find that the typical voltage lags in both discharge and charge curves of Li—S batteries were not found in the LG/S full cell. This is a direct sign that reaction of polysulfides with graphite as well as their irreversible deposition is reduced significantly compared to Li—S batteries, which is expected to benefit long term cycling stability of the battery. As shown in FIG. 6b, after around 100 cycles, high capacity retention of 81.25% could be achieved with a high efficiency of above 97%. This is believed to be the first instance of the use of commercial graphite anode for sulfur batteries with high reversible capacity and cycling stability.

However, extremely poor electrochemical properties were observed if the electrolyte was switched to traditional electrolyte 1M LiTFSI/DOL/DME with 0.1M LiNO$_3$ as additive. That is why graphite is seldom reported for anode in sulfur batteries. As shown in FIG. 6c, the first discharge capacity is only 220 mAhg$^{-1}$ with a slope discharging plateau, which is different to those in LG/S or Li—S batteries. In the subsequent charging process, only a limited capacity of 25 mAhg$^{-1}$ was realized, indicating high irreversibility of the electrochemical reactions. Upon cycling, the reversible capacities keep on decreasing and reach near zero after five cycles. For comparison, we also test Li—S cell having a Li metal anode with 5M LiTFSI/DOL electrolyte, however, its performance is still not comparable to that of LG/S full cell with respect to reversible capacity, Coulombic efficiency and long term cycling stability.

Figure 8:
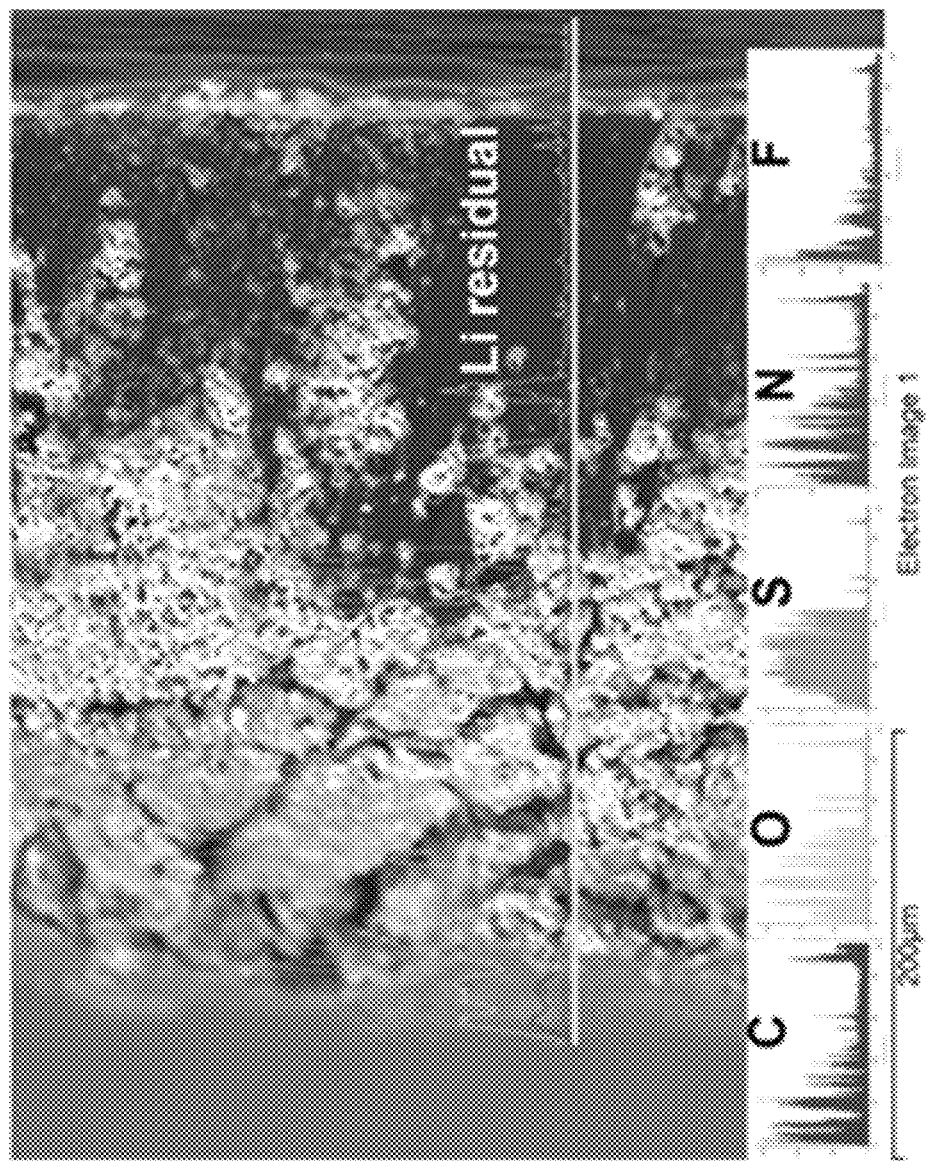
FIG. 8 is a cross-sectional SEM image of the Li metal electrode after 100 cycles in Li—S battery and the corresponding EDS results.
Figures 9, 9A, 9B:
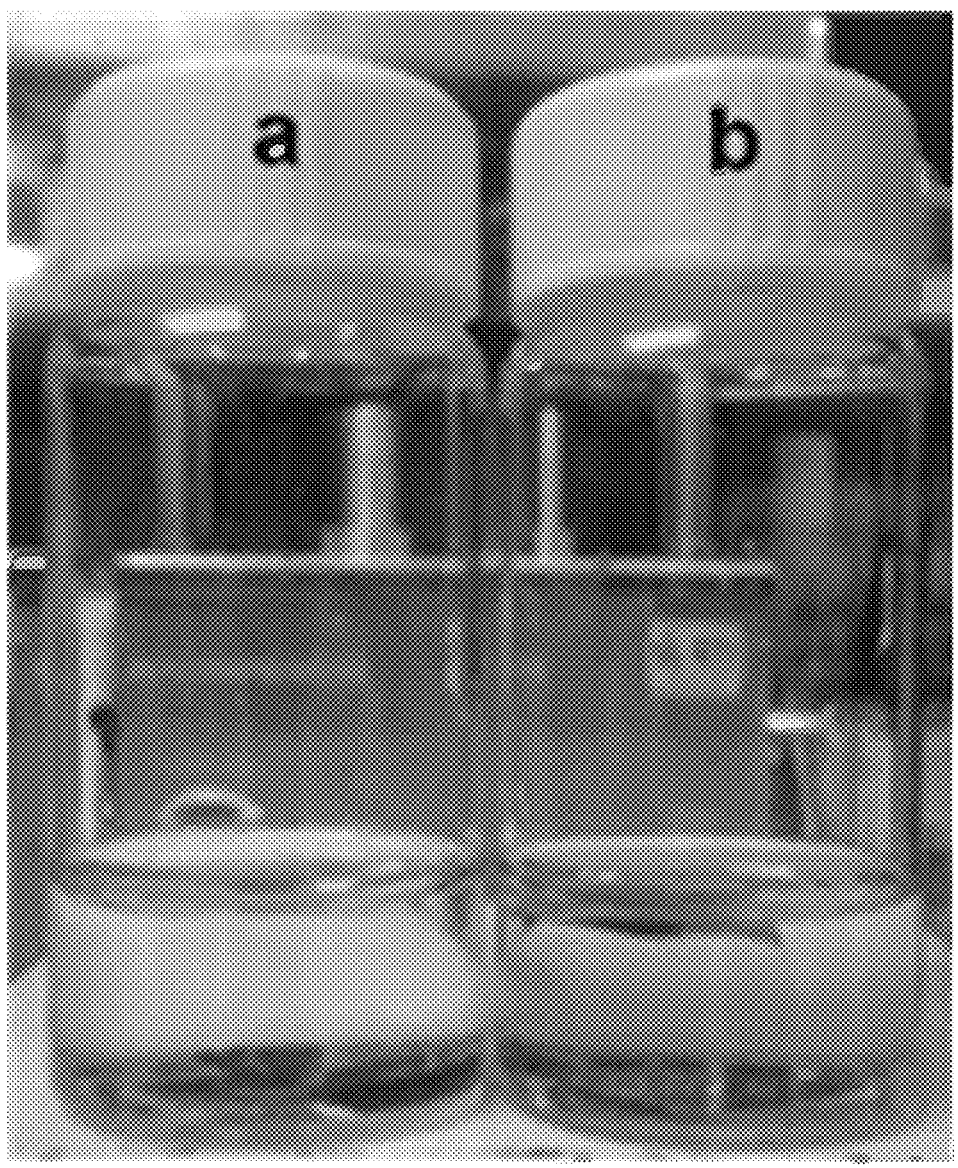
FIG. 9 is a digital photograph of the DOL/DME solvent containing (FIG. 9a) graphite electrode harvested from LG-S battery after 100 cycles and (FIG. 9b) Li metal electrode harvested from Li—S battery after 100 cycles.

The above results indicate that the feasibility and improved electrochemical performance of LG/S full cell are attributed to both a graphite anode and a concentrated electrolyte composition. Graphite is crucial to the success of the strategy because of its novel features. First, graphite is structured in stable layered carbon frameworks and involves Li$^+$ intercalation/deintercalation instead of conversion during the discharge/charge processes, which enables stable interphase and thus long term cycling stability. This is different compared to anode materials based on conversion reactions like Li, Si, SiO and Sn, where large volume change upon cycling will cause fracture and continuous growth of SEI and lead to electrode failure. Second, the stable regenerative SEI layer functions as a protection layer covering the graphite and reducing the direct contact and reactions between the soluble polysulfide species and reductive anode. In a conversional Li—S battery, irreversible Li deposition/dissolution is a big issue and leads to thick and porous Li deposition or interphase on Li electrode, which becomes even more severe under practical conditions of high deposition current densities or when coupled with high loading sulfur cathode. These freshly formed Li depositions are very sensitive and react with polysulfides chemically. As a result, endless polysulfide shuttle will happen during charging and sulfur will get lost to form short-chain polysulfides or solid Li$_2$S/Li$_2$S$_2$ at the surface of Li anode (FIG. 8). To prove this, the cycled Li and graphite anodes were harvested from the cells after 100 cycles and immersed in the solvent of DOL/DME. It is interesting to find that the solution with cycled Li changes to yellow color immediately while the one with cycled graphite remains nearly colorless (FIG. 9). These results indicate that sulfur species get lost from cathode side and accumulate on the Li metal electrode. This should be one of the major reasons of capacity decay for Li—S batteries, which, however, is significantly suppressed when using graphite anode.

Figure 11:
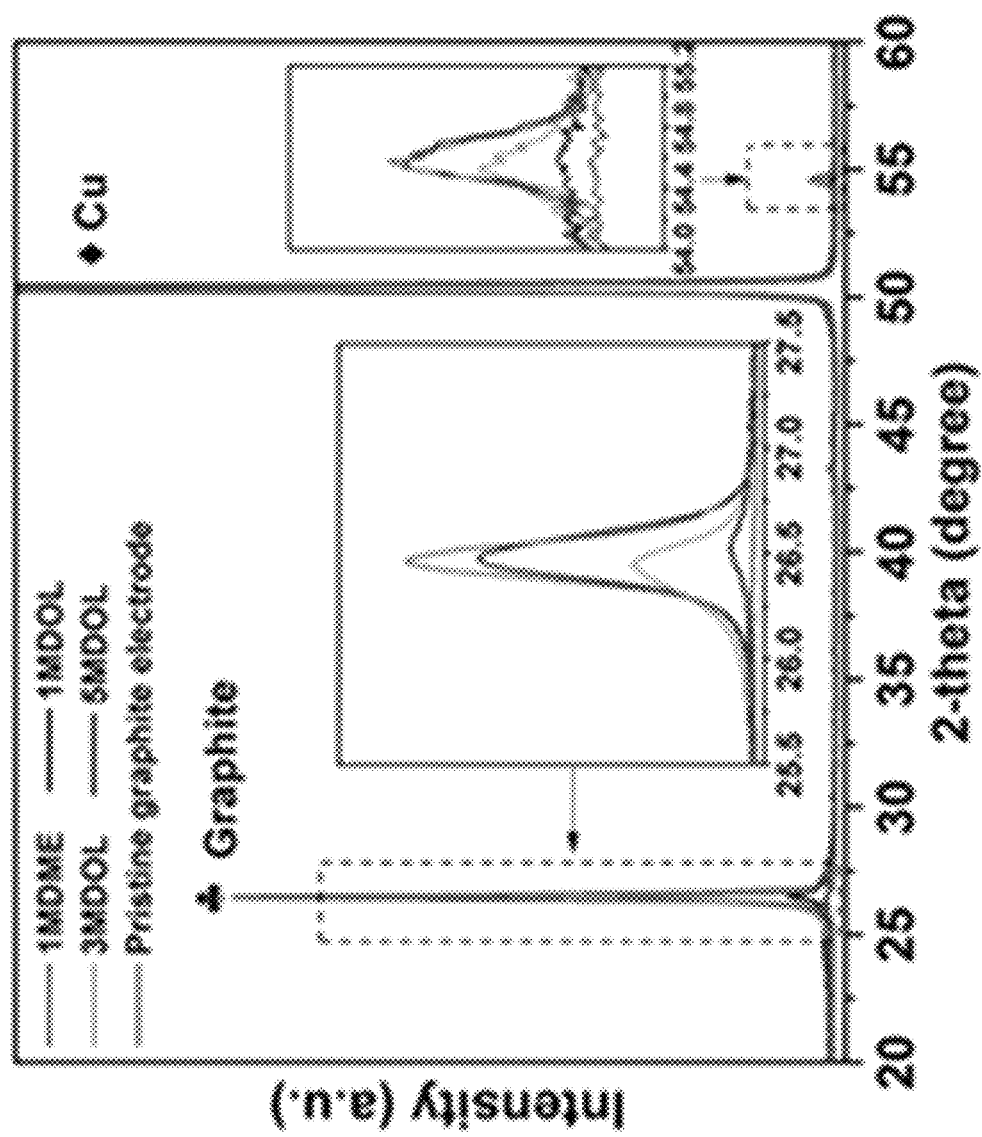
FIG. 11 shows XRD patterns of the graphite electrodes after cycled in various electrolyte (5 CV scans at 0.05 mVS$^{-1}$ within voltage range of 0.01-2.0 V)
Figures 12, 12A, 12B, 12C, 12D, 12E, 12F:
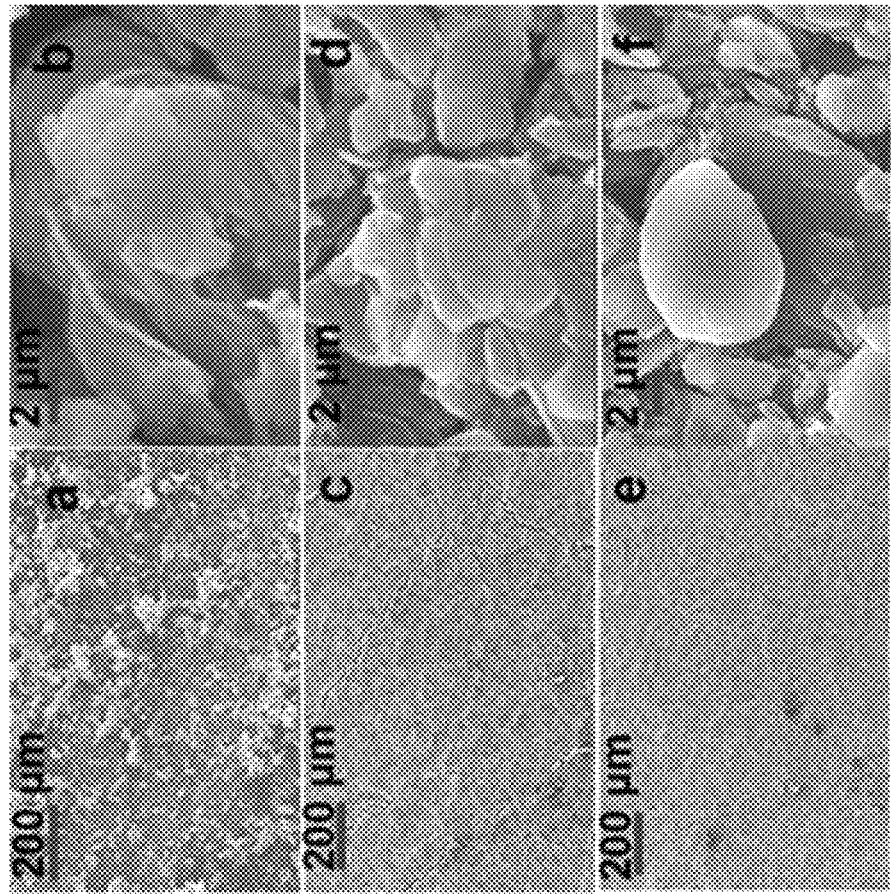
FIGS. 12a-12f show scanning electron microscope (SEM) images of graphite electrode after cycled in various electrolytes (5 CV scans at 0.05 mVS$^{-1}$ within voltage range of 0.01-2.0 V)

Different electrolytes lead to inverse electrochemical properties within the same cell configuration, i.e. with same both cathode and anode (FIG. 6). To understand the effects of the electrolyte composition underlying the battery performance, we decoupled the cathode and anode of LG-S full-cell and investigated electrochemical behaviors of graphite with Li as counter electrode in two electrolyte compositions, i.e. 5M LiTFSI/DOL and 1M LiTFSI in DOL/DME (1:1) FIG. 10$a$ shows three CV scans on graphite in 5M LiTFSI/DOL. Within the voltage range of 0.01-0.4 V, multiple-stage Li$^+$ intercalation/deintercalation curves were observed clearly and overlapped well upon cycling, indicating low electrochemical polarization and high reversibility of graphite. Beyond voltage range of 0.01-0.4 V, little reduction or oxidation was observed and demonstrates that negligible reactions involve SEI formation on graphite. This is different to the behaviors of graphite in ethylene carbonate (EC) contained electrolyte, where reduction of electrolyte happens at 0.7-0.9V in the first cycle and forms stable SEI on graphite. These results of CV analysis are very consistent with the cell charge/discharge behaviors of the graphite in the same electrolyte. At 0.1 C, capacities of 400 and 370 mAhg$^{-1}$ were obtained for the first discharge and charge processes, respectively (FIG. 10$b$). Stable capacities around 370 mAhg$^{-1}$ were maintained well with high efficiency of over 99% in the subsequent second and following cycles. Moreover, at increased current densities of 0.5, 1 and 2 C rates, graphite exhibits high capacities of 320, 280, and 150 mAhg$^{-1}$, respectively, indicating high Li$^+$ kinetics in the present bulk electrolyte and through the graphite interphase. By contrast, in an electrolyte composition of 1M LiTFSI DOL/DME, graphite shows very poor electrochemical properties in terms of both reversible capacity and cycling stability. As shown in CV scan (FIG. 10$c$), graphite shows significant reduction peaks between 0.80 and 1.0 V, which is contrast to its behaviors in 5M LiTFSI/DOL and ascribed to the co-intercalation of solvent into the layered structure of graphite (FIG. 10$c$). The co-intercalated solvents were further reduced between 0.80-0.40V. As a result of the solvent co-intercalation and reduction, the layered structure of graphite is damaged and exfoliated, which was proved by XRD and SEM analysis on graphite after cycling (FIGS. 11 and 12). Upon extended CV scans, the co-intercalation of solvent and exfoliation of graphite will be repeated until the failure of the electrode, which is also proved by cell charge/discharge performance. As shown in FIG. 10$d$, the graphite delivered a high capacity of near 450 mAhg$^{-1}$ in the first discharge with a big fraction of the capacity above 0.40 V; but only 50 mAhg$^{-1}$ was successfully charged back, resulting in a low efficiency of 11.1%. Upon cycling, only very limited capacities were obtained at either 0.1 C or higher C rates, indicating quick failure of graphite electrode (FIG. 10$d$ inset).

To further understand effects of salt concentrations on reversibility of graphite electrodes, we studied electrochemical behaviors of graphite in DOL by varying LiTFSI concentrations. Consistently, the reversibility of graphite strongly depends on the salt concentrations. At relatively low concentrations of 0.5M or 1M, evident reduction reactions between 0.9-0.4V were observed on graphite in the first cycle, which disappeared in subsequent scans. With increasing LiTFSI concentration, side reduction reactions were suppressed with enhanced reversibility (FIG. 13). When the concentration reaches 3M or higher, graphite shows significantly high reversibility and excellent cycling stability (FIGS. 13$d$ and 10$a$). Interestingly, the effects of concentrated electrolyte on the reversibility of graphite are generally observed in various electrolyte compositions regardless of salt and solvent types. As shown in FIG. 14$a$, graphite cannot work reversibly in 1M LiTFSI/DME, which is similar to that in 1M LiTFSI DOL/DME (FIG. 10$c$). However, in 7M LiTFSI/DME, graphite works stably and reversibly without observation of electrolyte co-intercalation or reductions (FIG. 14$b$). This phenomenon was also observed even in PC-based carbonate electrolyte compositions, which are well known to inactivate graphite by solvent co-intercalation and decomposition. As shown in FIGS. 14$c$, 14$e$, and 14$g$ only one single and irreversible reduction peak was observed on graphite in PC solvent with 1M of LiTFSI, LiPF$_6$ and LiClO$_4$, respectively. However, if the concentrations of these electrolytes were increased to 5M, reversible intercalation/deintercalation was always achieved on graphite (FIGS. 14$d$, 14$f$ and 14$h$).

Figures 15, 15A, 15B:
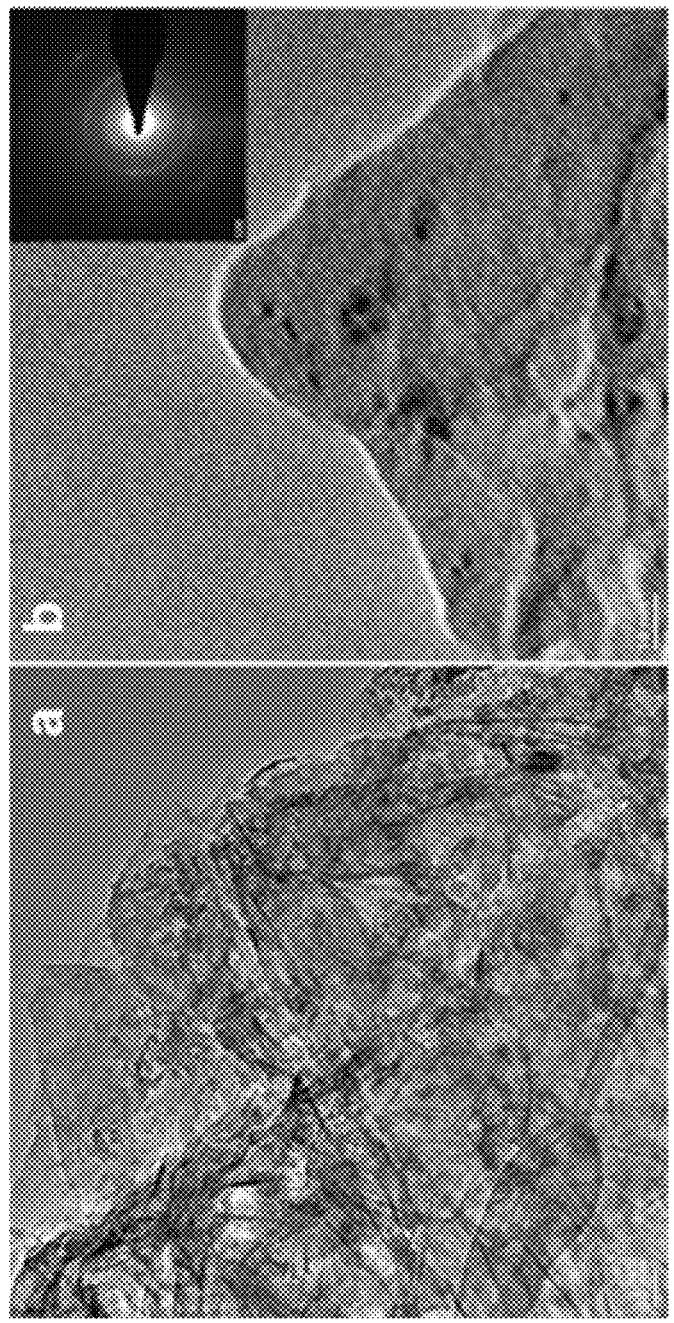
FIGS. 15a-15b show the morphology of graphite after 5 cycles in 1M LiTFSI DME electrolyte (0.05 mVs-1 within voltage range of 0.01-2.0 V)
Figure 19A:
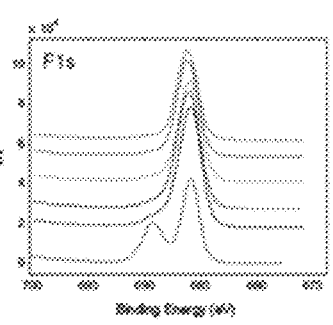
FIGS. 19a-19f show XPS depth files (from surface to 70.3 nm) of graphite electrode after 5 CV cycles in 1M LiTFSI DME electrolyte (0.05 mVs$^{-1}$ within voltage range of 0.01-2.0 V)
Figure 19B:
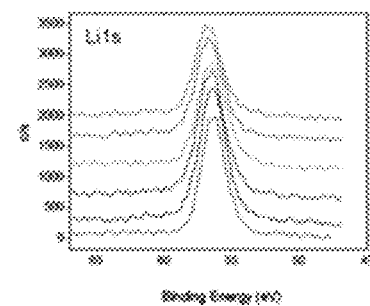
Figure 19C:
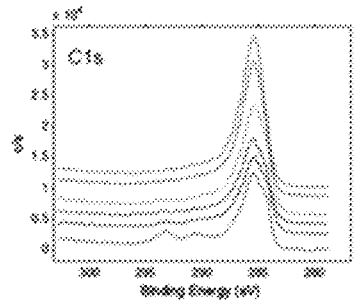
Figure 19D:
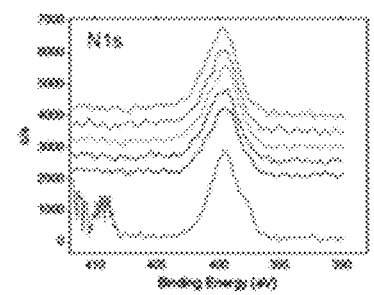
Figure 19E:
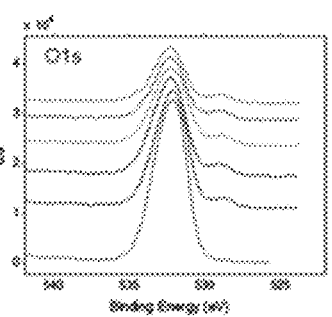
Figure 19F:
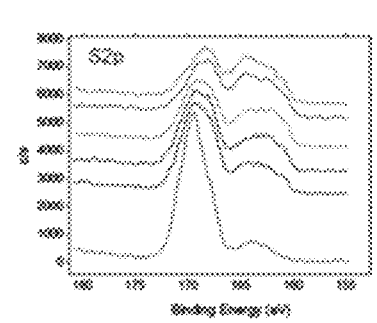
Figure 21A:
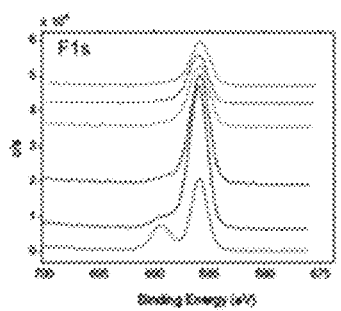
FIGS. 21a-21f are XPS depth files (from surface to 70.3 nm) of graphite electrode after 5 CV cycles in 5M LiTFSI DOL electrolytes (0.05 mVs$^{-1}$ within voltage range of 0.01-2.0 V)
Figure 21B:
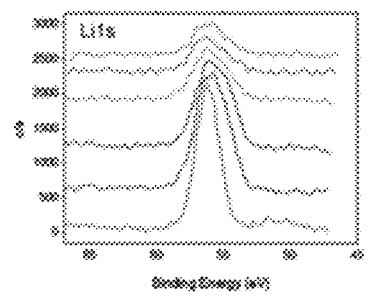
Figure 21C:
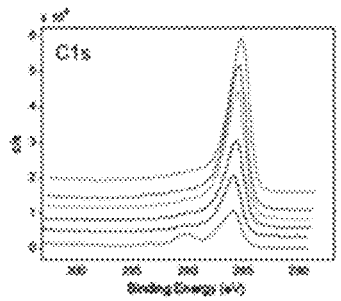
Figure 21D:
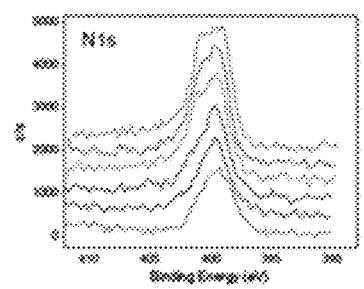
Figure 21E:
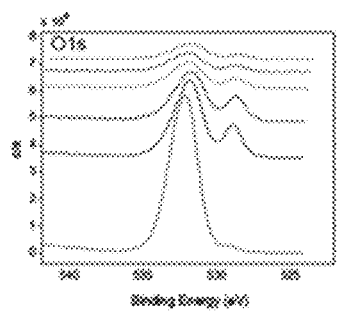
Figure 21F:
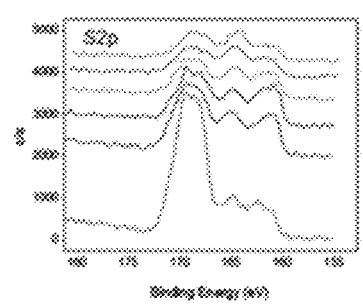

SEI formed on graphite is critical for its reversibility and long-term cycling stability. Results obtained on graphite within concentrated electrolytes encouraged us to study structure, morphology and interphase of graphite as well as their relationships to reversibility of graphite. Significant changes of structure and morphology were observed on graphite after cycled in different electrolyte systems. Severe exfoliation was observed on graphite if cycled in 1M LiTFSI/DME (FIGS. 12$a$ and 12$b$). This is further proved by TEM and HRTEM observation, which shows that graphite converts to amorphous structure (FIG. 15$b$ inset) with appearance of graphene sheet morphology (FIGS. 15$a$ and 15$b$). For graphite cycled in 0.5M LiTFSI in DOL, its particle morphology can be maintained with only minority exfoliated, which agrees well with CV results (FIG. 13). The HRTEM analysis on a selected graphite particle demonstrates that the graphite particle was covered by a thin and uniform SEI layer with thickness of ca. 3 nm (FIG. 16$a$). When salt concentration was increased to 1M, the thickness of SEI was reduced further and only some broken or distorted graphene layers were observed on the very surface of crystalline graphite particles (FIG. 12$d$). When electrolyte salt concentration was further increased to 5M, it was interesting to find that the surface of the cycled graphite is very smooth and clean without any observation of surface deposition or graphite exfoliation (FIG. 12$f$). As shown in HRTEM (FIG. 5$d$), the clear graphite lattice was observed without any distortion, indicating high reversibility and stability of graphite upon cycling in the electrolyte. The only difference found in HRTEM image is that the layered graphite lattice expands a little bit at the very surface (5 nm) compared to the bulk of graphite. It is exceptional that no SEI layer or surface depositions were observed on the surface of cycled graphite. For comparison, we also cycled graphite in traditional electrolyte (1M LiPF$_6$ EC/EMC) with same experimental conditions but found obvious SEI of ca.10 nm on the surface of graphite (FIG. 17$b$).

XPS and STEM-EELS techniques were employed on the cycled graphite electrodes after cycling in different electrolyte compositions. The elements of C, O, N, F, and Li are generally detected on the surface of these three graphite electrodes cycled in 1M LiTFSI/DME, 1M LiTFSI/DOL and 5M LiTFSI/DOL (FIG. 18). It is noted that the graphite electrodes used in the present study consist of graphite particles, carbon conductor (Super P) and binder (Polyvinylidene fluoride, PVDF); electrolyte may permeate all these components and form SEI upon electrochemical or chemical reactions. So, the XPS signals originate from not only the SEI layers on graphite, but also from Super P and binder interface. However, significant difference was observed on graphite electrodes after cycled in different electrolytes. High amount of F was found on the surface of graphite cycled in 1M LiTFSI/DME; while O is majority on graphite cycled in 1M LiTFSI/DOL (FIG. 18). Moreover, relative contents of O and F rise and decrease, respectively, with decrease and increase of LiTFSI concentrations in DOL. In other words, the relative contents of 0 and F are inversely proportional to the LiTFSI concentrations. It is known that reduction of LiTFSI results in the products of LiF, $Li_xSO_y$, and $Li_2NSO_2CF_3$. The high F/O atomic ratio (F/O=1.06) observed on the graphite after cycled in LiTFSI/DME indicates significant decomposition of LiTFSI during electrochemical reduction. This is verified by high resolution XPS spectra of the individual elements. As shown in FIG. 19, a broad peak at relatively high energy of 294 eV (—$CF_x$) in C1s spectrum and a shoulder peak at 398 eV ($Li_3N$) in N1s spectrum were found and previously ascribed to the decomposition of LiTFSI during electrochemical reduction. For graphite cycled in DOL based electrolyte, the F/O atomic ratio is relatively low (F/O=0.4 for 1M LiTFSI/DOL and F/O=0.27 for 5M LiTFSI/DOL) and no additional peaks were observed at 294 eV in C1s or 398 eV in N1s spectra (FIGS. 20 and 21). This means decomposition of LiTFSI is negligible in DOL solvent. The results of depth etch XPS indicate that the thickness of SEI formed in DME is much higher than those in DOL solvents (FIG. 22). In particular, the SEI formed in 5M LiTFSI/DOL is very thin and primarily composed by O, C, Li with a trace of F, N, and S (FIG. 22). This is consistent with its clean surface observed in HRTEM (FIG. 5d) and further proves that there is, at most, a very thin SEI but, typically, a bare surface of graphite cycled in 5M concentrated electrolyte composition. It is noted that SEI on carbon conductor or binder contained in electrode may also contribute signals in XPS analysis. To distinguish XPS signals of graphite from binder/conductor, STEM-EELS was performed on graphite cycled in 5M LiTFSI/DOL electrolyte. It is found that only elements of C, O were detected on graphite surface without observation of N, S and F (FIG. 23). This strongly indicates that the interphase of graphite in concentrated DOL based electrolytes (e.g. 5M) is independent of decomposition of LiTFSI. Another interesting finding is that a very small amount of, if any, Li element was detected at the surface of graphite particle, which is contrast to the traditional wisdom that Li based organic or inorganic salts will form on graphite and act as SEI.

Materials.

The Graphite based composite electrode was provided by CAMP Facility at Argonne National Laboratory. The composition and chemistry of the electrode is noted in Table 1 below. The Li anode used in the present study is Li chips (99.9%) with dimension of 15.6 mm in diameter and 0.45 mm in thickness. The lithium salts of lithium bis(trifluoromethanesulphonyl) imide ($LiN(SO_2CF_3)_2$, LiTFSI), $LiPF_6$, $LiClO_4$, and solvents of 1,3-dioxolane (DOL), 1,2-dimethoxyethane (DME), Ethylene carbonate (EC), Ethyl Methyl Carbonate (EMC), propylene carbonate (PC) (BASF, USA) were used in the present study.

Electrolyte Preparation.

Various types of electrolyte compositions with different concentrations are used in present study to evaluate stability of graphite and electrochemical properties of sulfur batteries. The electrolyte compositions were generally prepared by dissolving salts in corresponding solvents by controlling ratios of molar number(salt)/volume (solvent). For example, LiTFSI/DOL electrolytes with molar ratios of 0.5M, 1M, 3M, 5M, 6M, are prepared by dissolving 0.5, 1, 2, 3, 5, and 6 mol of LiTFSI in 1 L DOL solvent. The conductivity of the electrolytes was measured by WP 600 Series Meters (Oakton). The cathode of carbon/sulfur composite is prepared by a melt-diffusion method as described in Zheng et al, *J. of the Electrochemical Society* 2013, 160, A2288. The electrolyte compositions and properties are shown in Table 2 below.

Electrochemical Measurements.

The electrochemical properties of Li-G half-cell, Li—S half-cell and Li-G full-cell were evaluated with CR2325 coin-type cell (Canadian National Research Council). The cathode was composed of 580/IKB composite, carbon conductors, Carboxymethyl cellulose/Styrene Butadiene Rubber (CMC/SBR, 1:2 in weight) water based binder with a weight ratio of 80:10:10. The mass loading of the electrode is around 2 mg sulfur cm-2. The coin cells were assembled in a dry and inert MBraun glove box. The electrochemical performance was measured galvanostatically at various C rates on an Arbin BT-2000 battery tester at room temperature.

Characterization.

Cycled graphite electrodes were harvested from the cells for characterization by SEM, XRD and XPS, TEM, and STEM-EELS analyses. Before the measurements, the electrodes were immersed in solvents of DOL, DME, or DMC depending on the electrolytes used for cycling for 24 h and then rinsed with fresh solvents three times before drying under vacuum. The structure of the graphite electrode before and after cycling was characterized on a Rigaku D/MAX-2000 X-ray powder diffractometer using Cu Kα radiation (λ=1.5418 Å) with an operating voltage and current of 40 kV and 30 mA, respectively. The XRD patterns were obtained with a scan speed of 0.02° per step over a 2 range of 10-80°. SEM images and the corresponding EDS analysis of the Li electrodes for both the surface and cross-sections were obtained with a xx microscope with Oxford EDS/EDAX. XPS measurements were performed on a Physical Electronics Quantera Scanning X-ray Microprobe. This system uses a focused monochromatic Al $K_α$ X-ray (1486.7 eV) source for excitation and a spherical section analyzer. The instrument has a 32 element multichannel detection system. A 100 W X-ray beam focused to a 100 μm diameter was rastered over a 1.4 mm×0.1 mm rectangular portion of the sample. The X-ray beam was incident normal to the sample and the photoelectron detector was 45° off-normal. High-energy resolution (narrow scan) X-ray photoemission spectra were collected using a pass-energy of 69.0 eV with a step size of 0.125 eV. All of the spectra were charge referenced using the C1s line at 285.0 eV for comparison purposes. For TEM and STEM-EELS microanalysis, the graphite electrode before and after cycled in various electrolytes were dusted on a lacy carbon TEM grid. Conventional TEM imaging and selective area electron diffraction (SAED) were conducted using Titan 80-300 microscope operated at 300 kV. The microscope is equipped with an image Cs corrector for objective lens. Electron energy loss spectroscopy (EELS) was acquired in STEM model using Gatan Image Filter (GIF, Quantum 965) with electron beam convergence angle as 17.8 mrad and collection semiangle is about ~50 mrad. To avoid electrode contamination or side reactions with atmospheric moisture and oxygen, the samples were transferred for XPS analysis in sealed vessels which were filled with Ar gas.

TABLE 1

Composition and physical parameters of the graphite electrode.

| Composition (wt %) | | | | | Thickness ($\mu$m) | | |
|---|---|---|---|---|---|---|---|
| Timcal | | | | | | | |
| CGP-A12 | C45 carbon | Oxalic acid | PVDF | Porosity (%) | Cu foil | Coating | Total |
| 89.8 | 4 | 0.17 | 6 | 38.8 | 10 | 43 | 53 |

CGP-A12 is a commercialized graphite, and Timcal C45 carbon is a kind of carbon black used as conductor for the electrode.

TABLE 2

Ionic conductivity of DOL based electrolyte solutions with various concentrations of LiTFSI

| LiTFSI/solvent (mol/L) | Li$^+$/DOL ratio (mol/mol) | Ionic conducity (mScm$^{-1}$) | density (gml$^{-1}$) |
|---|---|---|---|
| 0.5 | 28.60 | 0.63 | 1.07 |
| 1 | 14.30 | 1.87 | 1.17 |
| 2 | 7.15 | 3.91 | 1.25 |
| 3 | 4.77 | 4.43 | 1.28 |
| 5 | 2.86 | 3.35 | 1.41 |
| 6 | 2.38 | 2.44 | 1.34 |

In view of the many possible embodiments to which the principles of the disclosed compositions, method and devices may be applied, it should be recognized that the illustrated embodiments are only preferred examples of the invention and should not be taken as limiting the scope of the invention.

What is claimed is:

1. A battery device comprising:
   an anode comprising graphite;
   a cathode comprising sulfur; and
   an electrolyte composition selected from:
   (i) a solute comprising lithium bis(trifluoromethanesulphonyl) imide and a solvent comprising 1,3-dioxolane, wherein the solute concentration in the electrolyte composition is at least 3M, as measured by moles of solute divided by the volume of the solvent without considering the volume change of the electrolyte composition after dissolving the solute;
   (ii) a solute comprising lithium bis(trifluoromethanesulphonyl) imide and a solvent comprising 1,2-dimethoxyethane, wherein the solute concentration in the electrolyte composition is at least 7M, as measured by moles of solute divided by the volume of the solvent without considering the volume change of the electrolyte composition after dissolving the solute; or
   (iii) a solute selected from lithium bis(trifluoromethanesulphonyl) imide, LiPF$_6$, or LiClO$_4$, and a solvent comprising propylene carbonate, wherein the solute concentration in the electrolyte composition is at least 5M, as measured by moles of solute divided by the volume of the solvent without considering the volume change of the electrolyte composition after dissolving the solute.

2. A method comprising:
   cycling the battery device of claim 1; and
   forming a regenerative layer on a surface of the anode only during charging of the battery device, wherein the regenerative layer comprises at least one solute from the electrolyte composition.

3. The battery device of claim 1, wherein the electrolyte composition is the electrolyte composition (i).

4. The battery device of claim 1, wherein the electrolyte composition is the electrolyte composition (ii).

5. The battery device of claim 1, wherein the electrolyte composition is the electrolyte composition (iii).

6. The battery device of claim 3, wherein the solvent consists of 1,3-dioxolane.

7. The battery device of claim 1, wherein the device undergoes charge/discharge cycles without significant decline in specific capacity over at least 100 cycles.

8. The battery device of claim 1, wherein the regenerative solid electrolyte interface layer does not include any products from decomposition of the electrolyte solute.

9. The battery device of claim 1, wherein the electrolyte composition does not include ethylene carbonate.

* * * * *